United States Patent
Seo

(10) Patent No.: US 11,509,742 B2
(45) Date of Patent: Nov. 22, 2022

(54) METHOD AND APPARATUS FOR EDGE COMPUTING SERVICE

(71) Applicant: SAMSUNG ELECTRONICS CO., LTD., Suwon-si (KR)

(72) Inventor: Jihwan Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/065,947

(22) Filed: Oct. 8, 2020

(65) Prior Publication Data

US 2021/0112136 A1 Apr. 15, 2021

(30) Foreign Application Priority Data

Oct. 10, 2019 (KR) .................. 10-2019-0125682

(51) Int. Cl.
*G06F 15/167* (2006.01)
*H04L 67/5682* (2022.01)
(Continued)

(52) U.S. Cl.
CPC ......... *H04L 67/5682* (2022.05); *H04W 4/021* (2013.01); *H04W 4/029* (2018.02); *H04W 4/50* (2018.02); *H04W 60/00* (2013.01)

(58) Field of Classification Search
CPC ......... H04W 4/029; H04W 4/50; H04W 4/02; H04W 4/021; H04W 60/00; H04W 64/00;
(Continued)

(56) References Cited

U.S. PATENT DOCUMENTS

| | | | |
|---|---|---|---|
| 9,304,208 B2 | 4/2016 | Lim et al. | |
| 10,110,495 B1 | 10/2018 | Sabella et al. | |

(Continued)

FOREIGN PATENT DOCUMENTS

| | | |
|---|---|---|
| CN | 109450512 | 3/2019 |
| KR | 10-2017-0042039 | 4/2017 |

(Continued)

OTHER PUBLICATIONS

Search Report and Written Opinion dated Jan. 20, 2021 in counterpart International Patent Application No. PCT/KR2020/013799.

(Continued)

*Primary Examiner* — Dustin Nguyen
*Assistant Examiner* — Hao H Nguyen
(74) *Attorney, Agent, or Firm* — Nixon & Vanderhye, P.C.

(57) ABSTRACT

Methods and apparatuses for edge computing services are provided, and a method of caching, by an edge data network, data from a service server includes obtaining information about a location of a terminal from a $3^{rd}$ Generation Partnership Project (3GPP) network, generating movement information of the terminal in a region of interest based on information about correspondence between the information about the location of the terminal and a configured region of interest, and caching data from the service server, the data being determined based on the movement information of the terminal in the region of interest and a configured cache rule.

20 Claims, 22 Drawing Sheets

(51) Int. Cl.
*H04W 4/029* (2018.01)
*H04W 60/00* (2009.01)
*H04W 4/50* (2018.01)
*H04W 4/021* (2018.01)

(58) Field of Classification Search
CPC .... H04W 48/04; H04W 8/02; H04L 67/2852; G01C 21/3682; H04M 1/72457; H04M 2242/15; H04M 2242/30; H04M 2250/10
See application file for complete search history.

(56) References Cited

U.S. PATENT DOCUMENTS

| | | | |
|---|---|---|---|
| 10,136,351 B2 | 11/2018 | McCormick et al. | |
| 2005/0070296 A1* | 3/2005 | Maanoja | H04W 8/10 455/456.1 |
| 2009/0005068 A1* | 1/2009 | Forstall | H04W 76/50 455/456.1 |
| 2014/0214315 A1* | 7/2014 | Heo | H04W 4/029 701/410 |
| 2015/0381756 A1* | 12/2015 | Lotfallah | H04L 67/568 709/213 |
| 2016/0378665 A1* | 12/2016 | Li | G06F 16/172 711/141 |
| 2017/0104839 A1* | 4/2017 | Starsinic | H04W 72/04 |
| 2018/0069760 A1* | 3/2018 | Zhang | H04L 41/0896 |
| 2018/0317157 A1* | 11/2018 | Baek | H04W 48/18 |
| 2019/0053108 A1* | 2/2019 | Trang | H04L 67/563 |
| 2019/0178676 A1 | 6/2019 | Oh | |
| 2019/0356742 A1* | 11/2019 | Ali | H04L 67/143 |
| 2020/0053638 A1* | 2/2020 | Edge | G01S 19/48 |
| 2020/0145699 A1* | 5/2020 | Hong | G06N 20/00 |
| 2020/0259878 A1* | 8/2020 | Yang | H04L 67/18 |
| 2020/0314731 A1* | 10/2020 | Ryu | H04W 48/12 |
| 2020/0337093 A1* | 10/2020 | Kim | H04W 64/00 |
| 2020/0366733 A1* | 11/2020 | Parvataneni | H04L 67/322 |
| 2021/0051559 A1* | 2/2021 | Edge | H04W 8/12 |
| 2021/0112137 A1* | 4/2021 | Soloway | H04L 67/5682 |
| 2021/0306842 A1* | 9/2021 | Rivas Molina | H04L 12/1403 |

FOREIGN PATENT DOCUMENTS

| | | |
|---|---|---|
| KR | 10-2018-0040949 | 4/2018 |
| KR | 10-2019-0070269 | 6/2019 |
| WO | WO-2018031070 A1 * | 2/2018 |
| WO | 2019/098623 | 5/2019 |

OTHER PUBLICATIONS

Kekki et al., "MEC in 5G networks", ETSI White Paper No. 28, First edition—Jun. 2018, 28 pages.
"Positioning With LTE", Ericsson White Paper, Sep. 2011, 12 pages.
Pencheva et al., "Location service in mobile edge computing", IEEE Conference, Conference dates Jul. 4-7, 2017, Published in: 2017 Ninth International Conference on Ubiquitous and Future Networks, (ICUFN), 1 page abstract.
Examination Report dated Sep. 1, 2022 in counterpart Indian Patent Application No. 202247024543 and English-language translation.
Anonymous: "3 Generation Partnership Project; Technical Specification Group Services and System Aspects; Study on application architecture for enabling Edge Applications; (Release 17)", France, No. V1.0.0 Sep. 12, 2019, pp. 1-78, XP051784519.
Intel: "Pseudo-CR on terminology refinements",3GPP Draft; S6-191383, France, vol. SA WG6, No. Roma, Italy; Jul. 8, 2019-Jul. 12, 2019 Jul. 1, 2019, XP051757941.
Extended European Search Report dated Sep. 30, 2022 in EP Patent Application No. 20875568.6.

* cited by examiner

METHOD AND APPARATUS FOR EDGE COMPUTING SERVICE

CROSS-REFERENCE TO RELATED APPLICATION

This application is based on and claims priority under 35 U.S.C. § 119 to Korean Patent Application No. 10-2019-0125682, filed on Oct. 10, 2019, in the Korean Intellectual Property Office, the disclosure of which is incorporated by reference herein in its entirety.

BACKGROUND

1. Field

The disclosure relates to methods and apparatuses for edge computing services (e.g., multi-access edge computing (MEC) services).

2. Description of Related Art

Recently, edge computing technology for transmitting data by using an edge server has been discussed. Edge computing technology may include, for example, multi-access edge computing (MEC) or fog computing (FOC). Edge computing technology may refer to technology for providing data to an electronic apparatus through a separate server (hereinafter referred to as 'edge server' or 'MEC server') provided at a location geographically close to the electronic apparatus, for example, in or near a base station. For example, among at least one application installed in an electronic apparatus, an application requiring low latency may transmit/receive data through an edge server located at a geographically close location, instead of through a server located in an external data network (DN) (e.g., Internet).

Recently, a service using edge computing technology (hereinafter, referred to as 'MEC-based service' or 'MEC service') has been discussed, and research and development on electronic apparatuses have been conducted to support an MEC-based service. For example, an application of an electronic apparatus may transmit/receive edge computing-based data to/from an edge server (or an application of an edge server) on an application layer.

With the progress of research and development for supporting an MEC-based service, a scheme for shortening the latency of an MEC server providing an MEC-based service has been discussed. For example, a method by which an MEC server caches data to be provided to a terminal from a service server has been discussed.

SUMMARY

Embodiments of the disclosure provide a method and apparatus for an edge computing service.

Additional aspects will be set forth in part in the description which follows and, in part, will be apparent from the description.

According to an example embodiment of the disclosure, a method of caching, by an edge data network, data from a service server includes: obtaining information about a location of a terminal from a $3^{rd}$ Generation Partnership Project (3GPP) network; generating movement information of the terminal in a region of interest, based on information about correspondence between the information about the location of the terminal and the region of interest; and caching data from the service server, the data being determined based on the movement information of the terminal in the region of interest and a configured cache rule.

According to an example embodiment of the disclosure, an edge data network for caching data from a service server includes: a communicator comprising communication circuitry; a memory storing a plurality of instructions; and a processor configured to execute the plurality of instructions to: obtain information about a location of a terminal from a $3^{rd}$ Generation Partnership Project (3GPP) network, generate movement information of the terminal in a region of interest based on information about correspondence between the information about the location of the terminal and the region of interest, and cache data from the service server, the data being determined based on the movement information of the terminal in the region of interest and a configured cache rule.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
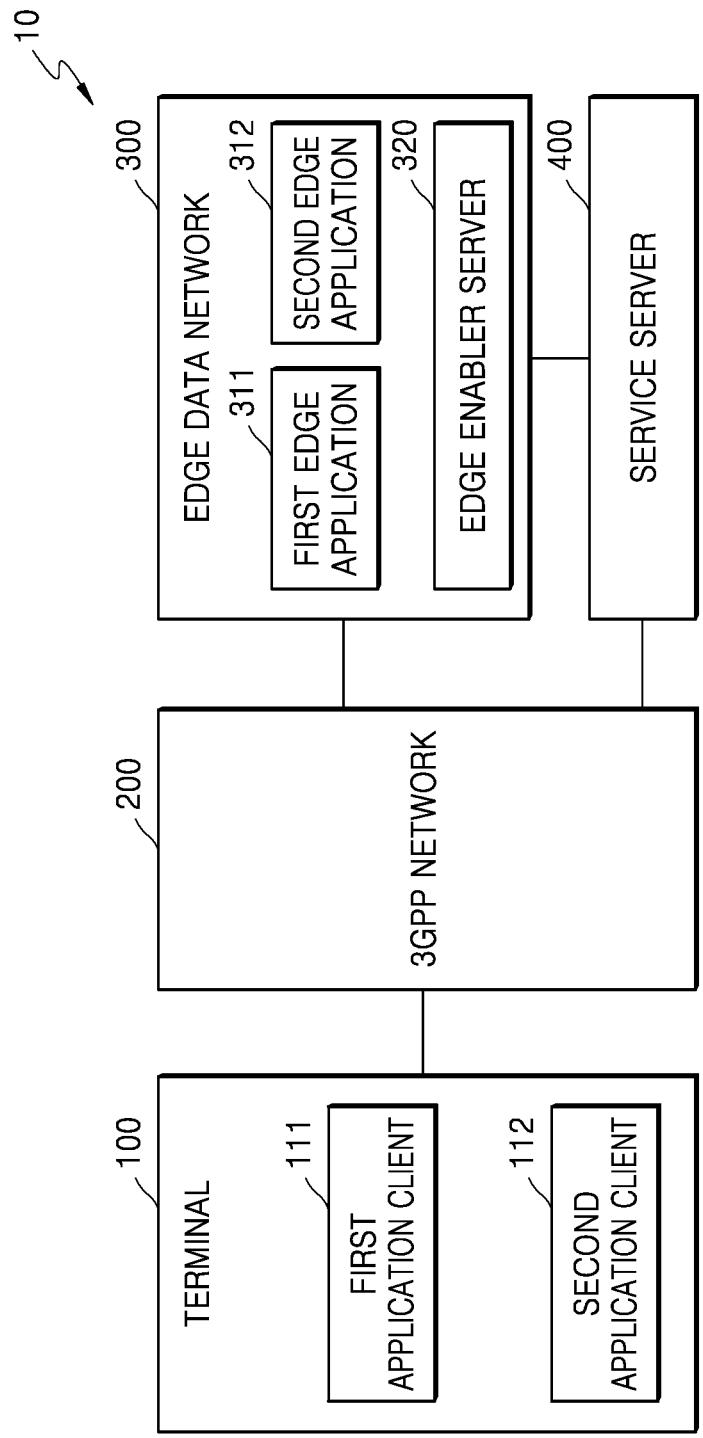
FIG. 1 is a block diagram illustrating an example network environment for supporting a multi-access edge computing (MEC)-based service according to various embodiments.

Hereinafter, various example embodiments of the disclosure will be described in greater detail with reference to the accompanying drawings.

In describing the embodiments of the disclosure, descriptions of technical contents that are well known in the technical field to which the disclosure belongs and not directly related to the disclosure may be omitted. This is to more clearly convey the subject matter of the disclosure without obscuring the disclosure with unnecessary descriptions.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

Advantages and features of the disclosure and methods of achieving the same will be apparent from the various example embodiments of the disclosure described in greater detail below with reference to the accompanying drawings. The disclosure may, however, be embodied in many different forms and should not be construed as being limited to the embodiments of the disclosure described below; rather, these embodiments are provided by way of non-limiting example. Throughout the disclosure, like reference numerals may denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform by the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "~unit" used herein may refer, for example, to a software component or a hardware component such as a field-programmable gate array (FPGA) or an application-specific integrated circuit (ASIC), and the "~unit" may perform some functions. However, the "~unit" is not limited to software or hardware. The "~unit" may be configured to be in an addressable storage medium or may be configured to operate one or more processors. Thus, as an example, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~units" may be associated with the smaller number of components and "~units" or may be further divided into additional components and "~units". In addition, the components and "~units" may be implemented to operate one or more central processing units (CPUs) in a device or a security multimedia card. Also, in embodiments, the "~unit" may include one or more processors.

FIG. 1 is a block diagram illustrating an example network environment for supporting a multi-access edge computing (MEC)-based service according to various embodiments.

Referring to FIG. 1, a network environment 10 may include a terminal 100, a $3^{rd}$ Generation Partnership Project (3GPP) network 200, an edge data network 300, and a service server 400. However, the configuration of the network environment 10 is not limited to the configuration of FIG. 1.

According to various embodiments of the disclosure, each of the components included in the network environment 10 may refer, for example, to a physical entity unit or may refer to a software or module unit capable of performing an individual function. Thus, the component included in the network environment 10 may be referred to as an entity or may be referred to as a function.

According to various embodiments of the disclosure, the terminal 100 may refer, for example, to a device used by a user. For example, the terminal 100 may refer to a user equipment (UE), a remote terminal, a wireless terminal, or a user device. Also, the terminal 100 may include all types of devices.

According to various embodiments of the disclosure, the terminal 100 may drive (or execute) a plurality of application clients. For example, the terminal 100 may include a first application client 111 and a second application client 112. The plurality of application clients may request different network services based on, for example, at least one of the data transmission rate of the terminal 100, the delay time (or rate) (latency), the reliability, the number of terminals 100 accessing the network, the network access period of the terminal 100, or the average data usage. The different network services may include, for example, enhanced mobile broadband (eMBB), ultra-reliable and low latency communication (URLLC), or massive machine type communication (mMTC).

The application client of the terminal 100 may refer, for example, to a basic application pre-installed in the terminal 100 or an application provided by a third party. That is, application client may refer to a client application program driven in the terminal 100 for a particular application service. Various application clients may be driven in the terminal 100. At least one of the application clients may be used to provide a service from the edge data network 300 to the terminal 100. For example, the application client may be an application installed and executed in the terminal 100 and may provide a function of transmitting/receiving data through the edge data network 300. The application client of the terminal 100 may refer to application software (or module) that is executed on the terminal 100 to use a function provided by one or more particular edge applications.

According to various embodiments of the disclosure, a plurality of application clients 111 and 112 of the terminal 100 may perform data transmission with the service server 400 based on the required network service type or may perform edge computing-based data transmission with the edge data network 300. For example, when the first application client 111 does not require low latency, the first application client 111 may perform data transmission with the service server 400. As another example, when the second application client 112 requires low latency, the second application client 112 may perform MEC-based data transmission with the edge data network 300. However, the disclosure is not limited thereto, and the terminal 100 may determine whether to transmit/receive data to/from the service server 400 or the edge data network 300 based on various conditions other than latency.

According to various embodiments of the disclosure, the application client of the terminal 100 may be referred to as a UE application (App), an application client, a client application (App), or a UE application. Hereinafter, for convenience, the application client of the terminal 100 will be referred to as an application client.

According to various embodiments of the disclosure, the 3GPP network 200 may be a wireless communication system conforming to the 3GPP standard and may be connected to the terminal 100 to provide a wireless communication service to the terminal 100. The 3GPP network 200 may include a radio access network (RAN) and a core network. The 3GPP network 200 may include a $3^{rd}$ generation (3G) network, an LTE network, an LTE-A network, and a next-generation network (5G or NR). However, the disclosure is not limited thereto, and the 3GPP network 200 of the disclosure may include a network configured with other communication technologies.

According to various embodiments of the disclosure, the edge data network 300 may refer, for example, to a server to which the terminal 100 is connected to use an MEC service. The edge data network 300 may, for example, be arranged in a base station of the 3GPP network 200 to which the terminal 100 is connected or at a location geographically close to the base station and may provide content at least partially identical to the content provided by the service server 400. In various embodiments of the disclosure, MEC may be referred to as multi-access edge computing or mobile edge computing.

According to various embodiments of the disclosure, the edge data network 300 may be referred to as an MEC server, an MEC host, an edge computing server, a mobile edge host, an edge computing platform, or the like.

According to various embodiments of the disclosure, the edge data network 300 may execute a plurality of edge applications. For example, the edge data network 300 may execute a first edge application 311 and a second edge application 312. According to various embodiments of the disclosure, the edge application may refer to an application provided by a third party in the edge data network 300 providing an MEC service. The edge application may be used to establish a data session with the application client in order to transmit/receive data related to the application client. That is, the edge application may establish a data session with the application client. According to various embodiments of the disclosure, data session may refer to a communication path established by the application client of the terminal 100 and the edge application of the edge data network 300 to transmit/receive data.

According to various embodiments of the disclosure, the application of the edge data network 300 may be referred to as an edge application, an MEC application (App), an edge application server, or an ME (MEC) App and edge application. Hereinafter, for convenience, the application of the edge data network 300 will be referred to as an edge application.

According to various embodiments of the disclosure, the edge data network 300 may include an edge enabler server 320. According to various embodiments of the disclosure, the edge enabler server 320 may be referred to as a mobile edge computing (MEC) platform, a mobile edge (ME)

platform (MEP), a platform, or the like. The edge enabler server 320 will be described below in more detail with reference to FIG. 4A.

According to various embodiments of the disclosure, the service server 400 may provide content related to the application client of the terminal 100. For example, the service server 400 may provide a service or data necessary for the terminal 100 to drive (or execute) the application client and may provide the edge data network 300 with an edge application capable of providing an MEC service to the application client of the terminal 100. Also, the service server 400 may provide the edge data network 300 with a service or data necessary for the terminal 100 to drive (or execute) the application client. The service server 400 may, for example, be operated or managed by a content provider that provides content to the terminal 100.

Although not illustrated in FIG. 1, a data network (DN) may be provided between the 3GPP network 200 and the edge data network 300. According to various embodiments of the disclosure, the data network may provide a service (e.g., an Internet services or an IP multimedia subsystem (IMS) service) by transmitting/receiving data (or data packets) to/from the terminal 100 through the 3GPP network 200. For example, the data network may be managed by a communication service provider. In various embodiments of the disclosure, the edge data network 300 may be connected to the 3GPP network 200 through the data network (e.g., local DN).

According to various embodiments of the disclosure, when the first application client 111 or the second application client 112 is executed in the terminal 100, the terminal 100 may be connected to the edge data network 300 through the 3GPP network 200 to transmit/receive data for executing the application client. In this case, when data is transmitted from the terminal 100 to the edge data network 300 or when data is transmitted from the edge data network 300 to the terminal 100, transmission latency may occur. In various embodiments of the disclosure, the above transmission latency may be referred to as end-to-end transmission latency.

In various embodiments of the disclosure, when data is transmitted from the edge data network 300 to the terminal 100 through the 3GPP network 200, the edge data network 300 may or may not store only some of the data to be transmitted to the terminal 100. For example, as MEC services provided to the terminal 100 are diversified, the edge data network 300 may not store all data about all MEC services provided to the terminal 100. As for some MEC services, in order to provide an MEC service, the edge data network 300 may store only some of the data to be transmitted to the terminal 100 and may have to receive the other data from the service server 400 and then transmit the same to the terminal 100. Thus, when data not stored by the edge data network 300 is received from the service server 400 and then transmitted to the terminal 100, network transmission latency may occur.

In the disclosure, a non-limiting example method of reducing the above network transmission latency will be described. For example, the edge data network 300 may reduce the network transmission latency by proactively caching necessary data by accessing the service server 400 before providing an MEC service to the terminal 100.

Figure 2:
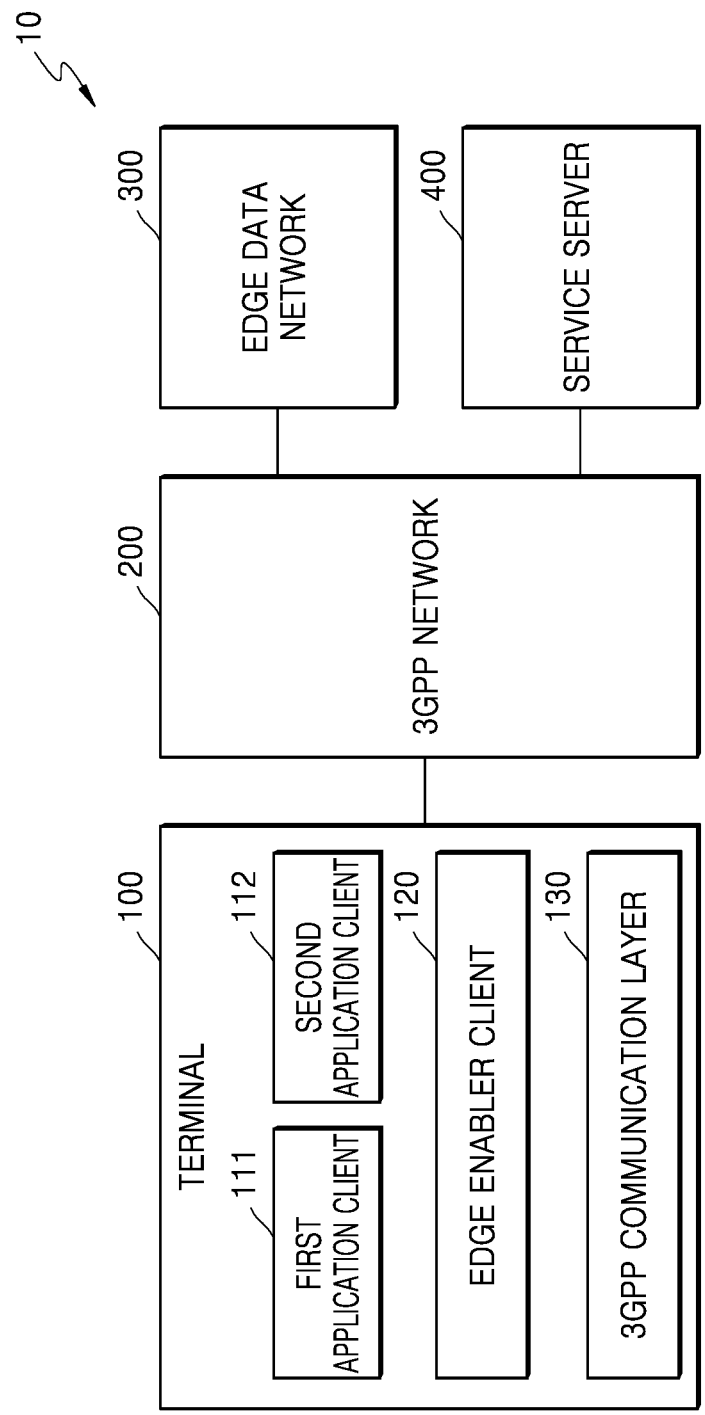
FIG. 2 is a block diagram illustrating an example network environment for supporting an MEC-based service around a terminal, according to various embodiments.

FIG. 2 is a block diagram illustrating an example network environment for supporting an MEC-based service around a terminal according to various embodiments.

According to various embodiments, the terminal 100 may include a first application client 111, a second application client 112, an edge enabler client 120, and a 3GPP communication layer 130. The first application client 111 and the second application client 112 may refer, for example, to a basic application pre-installed in the terminal 100 or an application provided by a third party. The first application client 111 and the second application client 112 may perform data transmission with the service server 400 based on the required network service type or may perform edge computing-based data transmission with the edge data network 300.

According to various embodiments of the disclosure, the edge enabler client 120 may refer to a layer that performs an operation in the terminal 100 for enabling the terminal 100 to use an MEC service. According to various embodiments, the edge enabler client 120 may also be referred to as an MEC enabling layer (MEL). The edge enabler client 120 may determine which application client may use an MEC service and connect a network interface such that data of the application client of the terminal 100 may be transmitted to the edge data network 300 providing an MEC service.

Also, the edge enabler client 120 may perform, with the 3GPP communication layer 130, an operation for allowing the terminal 100 to establish a data connection for using an MEC service. The 3GPP communication layer 130 may refer to a layer performing a modem operation for using a mobile communication system and may establish a wireless connection for data communication, register the terminal 100 in the mobile communication system, establish a connection for data transmission to the mobile communication system, and perform a function of transmitting/receiving data.

Figure 3:
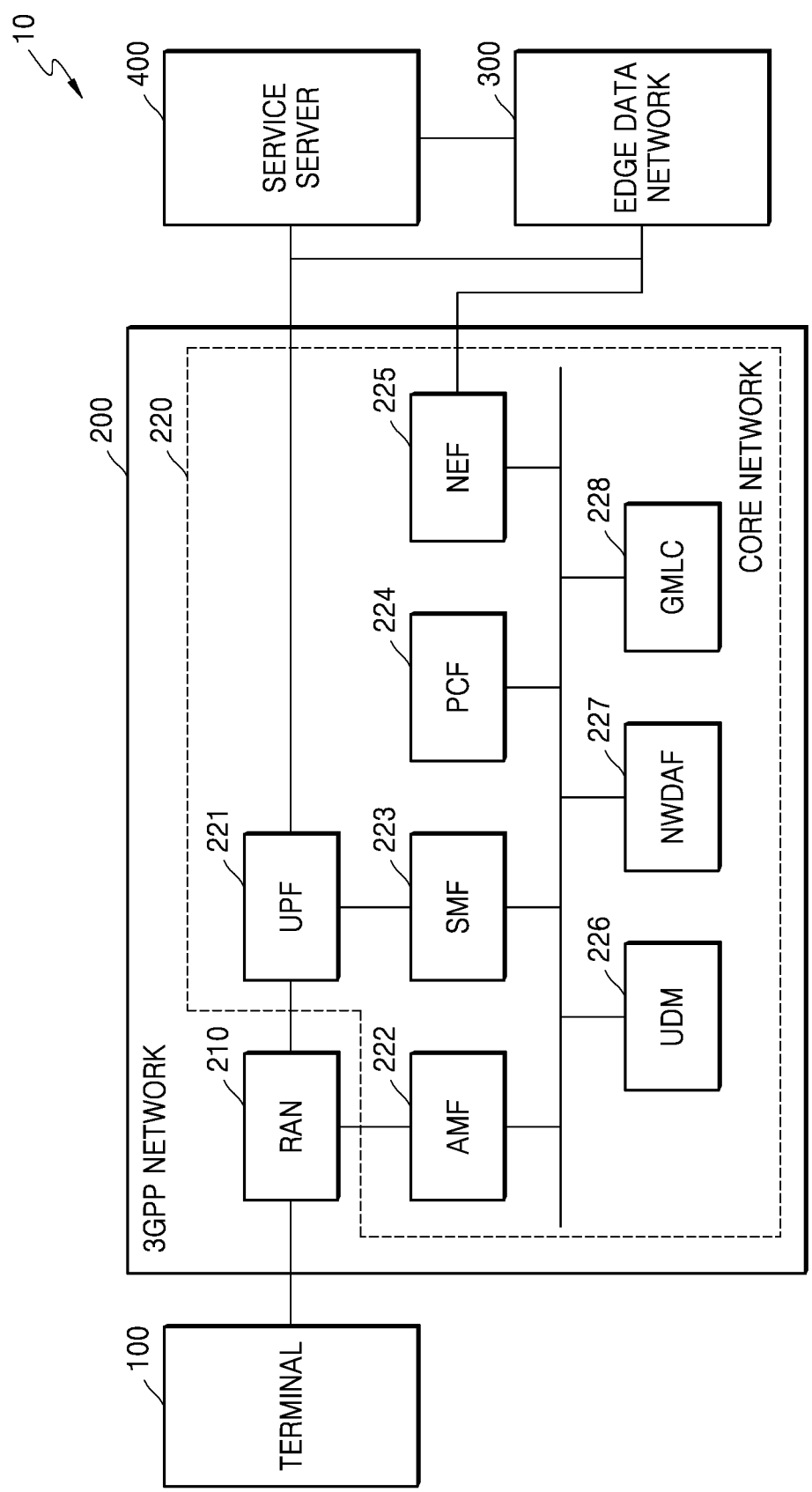
FIG. 3 is a block diagram illustrating an example network environment for supporting an MEC-based service around a $3^{rd}$ Generation Partnership Project (3GPP) network, according to various embodiments.

FIG. 3 is a block diagram illustrating an example network environment for supporting an MEC-based service around a 3GPP network according to various embodiments.

FIG. 3 illustrates a structure of a next-generation network (5G or NR) as an example of the structure of the 3GPP network 200. The next-generation network (NR or 5G) may be referred to as a 5G system and may include a next-generation base station (New Radio Node B (NR gNB) or NR base station) and a next-generation radio core network (New Radio Core Network (NR CN)). The terminal 100 may access an external network through the NR gNB and the NR CN.

However, herein, the 3GPP network 200 is not limited to the next-generation network (5G or NR), and the 3GPP network 200 may include a $3^{rd}$ generation (3G) network, an LTE network, and an LTE-A network in addition to the next-generation network. Also, herein, the structure of the next-generation network is not limited to the structure of the next-generation network illustrated in FIG. 3, and the structure of the next-generation network may not include some of the components illustrated in FIG. 3 or may further include components not illustrated in FIG. 3.

In various embodiments, the 3GPP network 200 may include a radio access network (RAN) 210 and a core network 220. In various embodiments of the disclosure, the RAN 210 of the 3GPP network 200 may be a network directly connected to the terminal 100 and may be an infrastructure providing wireless access to the terminal 100. The RAN 210 may include a plurality of base stations, and the plurality of base stations may perform communication through an interface formed therebetween. At least some of the interfaces between the plurality of base stations may be wired or wireless. The base station may be referred to as a gNode B, an eNode B, a Node B, a base station (BS), a radio access unit, a base station controller, a node on the network, or any other terms having equivalent technical meanings thereof.

In various embodiments, the core network 220 of the 3GPP network 200 may process data and control signals about the terminal 100 transmitted/received through the RAN 210. The core network 220 may perform various functions such as, without limitation, control of a user plane and a control plane, processing of mobility, management of subscriber information, charging, and interoperation with other types of systems (e.g., Long Term Evolution (LTE) systems). In order to perform the above various functions, the core network 220 may include a plurality of functionally-separated entities having different network functions (NFs).

For example, the core network 220 may include a user plane function (UPF) 221, an access and mobility management function (AMF) 222, a session management function (SMF) 223, a policy control function (PCF) 224, a network exposure function (NEF) 225, a user data management (UDM) 226, a network data analysis function (NWDAF) 227, and a gateway mobile location center (GMLC) 228.

The terminal 100 may be connected to the RAN 210 to access the AMF 222 that performs a mobility management function of the core network 220. The AMF 222 may be an NF that manages the mobility of the RAN 210. The SMF 223 may be an NF that manages the connection of a packet data network for providing packet data to the terminal 100. The connection between the terminal 100 and the SMF 223 may be a PDU session. The AMF 222 may be connected to the SMF 223, and the AMF 222 may route a session-related message to the terminal 100 to the SMF 223. The SMF 223 may be connected to the UPF 221 to allocate a user plane resource to be provided to the terminal 100 and establish a tunnel for transmitting data between the base station and the UPF 221.

The UPF 221 may provide a data path (or a data plane) between the terminal 100 and the edge data network 300. That is, the UPF 221 may function as a gateway for transmitting data (or data packets) transmitted/received by the terminal.

The terminal 100 and the edge data network 300 may transmit/receive data (or data packets) to/from each other through the UPF 221. A data network (DN) (not shown) may be provided between the edge data network 300 and the UPF 221. The UPF 221 may be located near the edge data network 300 to support an MEC service to the terminal 100 and may transmit the data packets of the terminal 100 to the edge data network 300 with low latency or transmit the data packets of the edge data network 300 to the terminal 100 with low latency.

The UPF 221 may also be connected to a data network (not shown) connected between the terminal 100 and the service server 400 through the Internet. The UPF 221 may route a data packet, which is to be transmitted through the Internet among the data packets transmitted by the terminal 100, to the data network between the service server 400 and the terminal 100. The PCF 224 may be an NF that applies the policy (e.g., service policy, charging policy, or policy on the PDU session) of a mobile communication service provider to the terminal 100 and controls information related to charging.

The NEF 225 may be an NF that exposes the functions (capabilities) and services of the NFs of the 3GPP network 200 to the outside. The NEF 225 may be connected to an external server (e.g., the edge data network 300) to transmit information about an event that occurred in an internal NF of the 3GPP network 200 to the external server or transmit information about an event requested by the external server to the internal NF. The functions and services exposed by the NEF 225 to the outside may include, for example, location-related event reporting of the terminal 100, session-related event reporting of the terminal 100, and mobility management event reporting of the terminal 100. The external server may subscribe the functions and services exposed by the NEF 225 to access the corresponding functions and services.

The UDM 226 may be an NF performing a function similar to that of a home subscriber server (HSS) of the 4G network and may be an NF storing information about subscribers. The UDM 226 may store subscription information of the terminal 100 or the context used by the terminal 100 in the network.

The NWDAF 227 may be an NF that provides a function of analyzing and providing the data collected in the 3GPP network 200. The NWDAF 227 may collect/store/analyze information from the 3GPP network 200 and provide the result thereof to other NFs, and the analysis result thereof may be used independently in each NF.

The GMLC 228 may be an NF that provides the location of a mobile device (e.g., a terminal) to support a location based service (LBS). The GMLC 228 may obtain and provide location information of the mobile device identified in various ways by the global positioning system (GPS) or the base station.

Figure 4A:
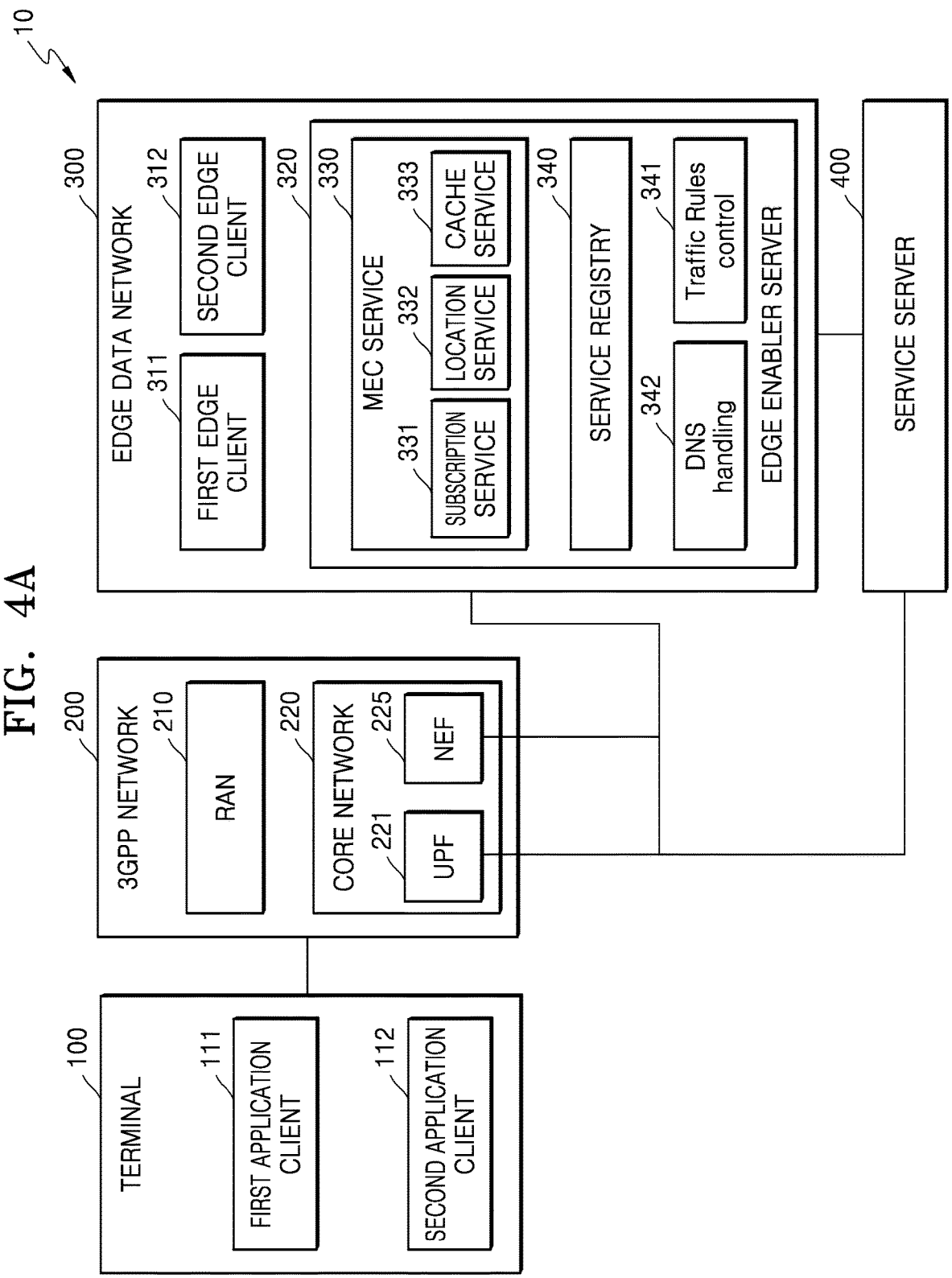
FIG. 4A is a block diagram illustrating an example network environment for supporting an MEC-based service around an edge data network, according to various embodiments.

FIG. 4A is a block diagram illustrating an example network environment for supporting an MEC-based service around an MEC server according to various embodiments.

According to various embodiments of the disclosure, the terminal 100 may include a first application client 111 and a second application client 112. The terminal 100 may be connected to the 3GPP network 200 to transmit/receive data related to the first application client 111 and the second application client 112.

According to various embodiments, the 3GPP network 200 may be connected to the edge data network 300 to transmit/receive data related to an MEC service. For example, the NEF 225 of the 3GPP network 200 may be connected to the edge data network 300 to transmit an event or information generated from an internal NF of the 3GPP network 200 to the edge data network 300 or transmit an event or information requested by the edge data network 300 to the internal NF.

According to an embodiment of the disclosure, the UPF 221 of the 3GPP network 200 may provide a data path (or a data plane) between the terminal 100 and the edge data network 300 or the service server 400. That is, the UPF 221 may function as a gateway for transmitting data (or data packets) transmitted/received by the terminal.

According to various embodiments of the disclosure, the edge data network 300 may provide an MEC service to the terminal 100. For this purpose, the edge data network 300 may, for example, be arranged in a base station of the 3GPP network 200 to which the terminal 100 is connected or at a location geographically close to the base station and may provide content at least partially identical to the content provided by the service server 400.

According to various embodiments, the edge data network 300 may include a plurality of edge applications (e.g., a first edge application 311 and a second edge application 312) and an edge enabler server 320. However, the configuration of the edge data network 300 is not limited thereto.

According to various embodiments, the edge application may be an application provided by a third party in the edge data network 300 and may establish a data session with the application client to transmit/receive data related to the application client.

According to various embodiments, the edge enabler server 320 may provide a function required to execute the edge application. For example, the edge enabler server 320 may provide a function or environment such that the edge application may provide an MEC service to the terminal 100 or the like or an edge application may use (consume) an MEC service. Also, the edge enabler server 320 may perform traffic control 341 or perform Domain Name System (DNS) handling 342.

According to various embodiments, the MEC service may collectively refer to a procedure and information-related service required to use the edge application. The MEC service may be provided or used (consumed) by the edge enabler server 320 or the edge application. For example, the edge application may provide an MEC service to the terminal 100 or may use an MEC service provided by the edge enabler server 320 in order to provide an MEC service to the terminal 100. Also, the edge enabler server 320 may provide the edge application with an MEC service that may be used by the edge application to provide an MEC service to the terminal 100. Hereinafter, the MEC service may refer to a service that is provided by the edge data network 300 or the edge application to the terminal 100 or a service that is provided by the edge enabler server 320 and may be used by the edge application.

According to various embodiments, the edge enabler server 320 may provide an MEC service to the edge application. For example, the edge enabler server 320 may provide various information (data and content such as information about the location of the terminal, caching data, and information about the subscribed service) to the edge application according to the provided MEC service. The edge application may provide an MEC service to the terminal 100 by using the MEC service provided by the edge enabler server 320. For example, the edge application may provide an MEC service to the terminal 100 based on the information provided as the MEC service by the edge enabler server 320. The MEC service provided to the terminal 100 may be a service necessary for the terminal 100 to drive the application client (e.g., data necessary to drive the application client).

According to various embodiments, the edge enabler server 320 may include an MEC service 330 and a service registry 340. The MEC service 330 may provide a service to the edge applications included in the edge data network 300. The MEC service 330 may be implemented as a module or software capable of performing an individual function. The service registry 340 may provide information about a service available in the edge data network 300. According to various embodiments, when an instance of the edge application is generated (instantiation), the edge enabler server 320 may internally register the edge application. The edge enabler server 320 may register the edge application and store information related to the edge application. The information related to the edge application stored by the edge enabler server 320 may include, for example, information about the MEC service that is to be provided by the edge application to the terminal 100 and information about whether the MEC service is a service required by the edge application or an optional service.

According to various embodiments of the disclosure, the edge application may register a new MEC service in the edge enabler server 320 (service registration) or search for the MEC service registered in the edge enabler server 320. The edge application may provide information about the MEC service to be registered to the edge enabler server 320 while registering the MEC service in the edge enabler server 320. The edge enabler server 320 may register an MEC service in the service registry 340.

According to various embodiments, the edge application may update the MEC service registered in the edge enabler server 320. For example, the edge application may transmit information about the MEC service to be updated to the edge enabler server 320 in order to update the MEC service registered in the edge enabler server 320. In this case, the edge enabler server 320 may update the updated MEC service in the service registry 340.

According to various embodiments, the edge enabler server 320 may transmit information about the MEC services registered in the service registry 340 to the edge application in the edge data network 300. For example, the edge enabler server 320 may transmit a list of MEC services registered in the service registry 340 to the edge application. Also, the edge enabler server 320 may transmit information about the availability of MEC services pre-registered or newly-registered in the service registry 340 to the edge application.

According to various embodiments, information indicating that the availability of MEC services has changed may be transmitted from the edge enabler server 320 to the edge applications in the edge data network 300. For example, when a new MEC service is registered in the service registry 340 or the MEC service registered in the service registry 340 is updated and thus the availability of the MEC service is changed, information indicating that the availability of MEC services has changed may be transmitted to the edge applications. In this case, the edge enabler server 320 may transmit information indicating that the availability of the corresponding MEC service has changed, to the edge applications that have registered the MEC service with the changed availability as a necessary service or an optional service.

According to various embodiments, the edge application may subscribe to the MEC service 330 registered in the service registry 340. The edge application may subscribe to the MEC service 330 by transmitting subscription request information about the MEC service 330 to the edge enabler server 320. That the edge application subscribes to the MEC service 330 may refer to the MEC service or information about the MEC service being continuously received from the edge enabler server 320. By subscribing to the MEC service 330 registered in the service registry 340, the edge application may receive an MEC service from the edge enabler server 320, use the MEC service, and provide the same to the terminal.

According to various embodiments, the MEC service 330 may provide various services to the edge application. For example, the MEC service 330 may provide a subscription service 331, a location service 332, a cache service 333, and the like to the edge application.

According to various embodiments, each of the MEC services (e.g., the subscription service, the location service, and the cache service) provided by the edge enabler server 320 may be provided in units of modules or software capable of performing an individual function. For example, the subscription service 331, the location service 332, and the cache service 333 may be respectively implemented as a subscription service module, a location service module, and a caching service module.

Also, according to various embodiments, the subscription service 331 and the location service 332 may be implemented as one module. For example, one service module may subscribe to an event related to the location of the terminal 100 and obtain information about the location of the terminal 100 to provide a service related to the location of the terminal 100.

According to various embodiments, the subscription service 331 may subscribe to an event of the 3GPP network 200 or a report of the event to obtain or provide necessary information. Subscribing to the event or the report of the event may refer to receiving, when an event occurs in the 3GPP network 200, a report of the event. The event of the 3GPP network 200 may refer to a particular state of the terminal 100 or the like on the 3GPP network 200, a particular situation occurring on the 3GPP network 200, or an event occurring in a particular situation. For example, the event may include an event related to the location of the terminal (e.g., the current location of the terminal, a location change, or the location of the terminal in a particular situation), the disconnection of the terminal, the access of the terminal, the roaming state of the terminal, or a communication failure.

According to various embodiments, the subscription service 331 may subscribe to a report of an event (event reporting) exposed by the NEF 225 of the 3GPP network 200 and obtain desired information through the report of the NEF 225 on the event. For example, the subscription service 331 may transmit a report request message on the event to the NEF 225 and receive a report message on the subscribed event from the NEF 225. The subscription service 331 may be used to provide the obtained information to the edge application or provide other MEC services thereto.

According to various embodiments, in relation to the subscription service 331, a subscription method for an event report to be subscribed to may be configured. For example, the number of event reports, the report period, the report periodicity information, the report periodicity, or the like may be configured.

According to various embodiments, the subscription service 331 may transmit information about an event report method to the NEF 225 while requesting the NEF 225 for a subscription for the report of an event related to the location of the terminal 100. The subscription service 331 may periodically or once receive an event report from the NEF 225 according to the event report method transmitted to the NEF 225.

According to various embodiments, the subscription service 331 may include a subscription service for an event related to the location of the terminal 100. For example, the subscription service 331 may subscribe to an event related to the location of the terminal 100 exposed by the NEF 225 of the 3GPP network 200 and receive a report of the NEF 225 on the event related to the location of the terminal 100. The report message received by the subscription service 331 from the NEF 225 may include information about the location of the terminal 100. The subscription service 331 may be used to provide obtained information about the location of the terminal 100 to the edge application or provide other MEC services (e.g., the location service, the cache service, and the like) thereto.

According to various embodiments, the event related to the location of the terminal 100 subscribed to by the subscription service 331 may include an event related to the location of the terminal 100 detected by the AMF 222 or the GMLC 228 of the 3GPP network 200. Through the report of the NEF 225 on the event related to the location of the terminal 100 detected by the AMF 222 or the GMLC 228, the subscription service 331 may obtain information about the location of the terminal 100 (e.g., the current location of the terminal 100, the most recently identified location of the terminal 100, or the like). The information about the location of the terminal 100 received from the NEF 225 may include GPS information, information about a region in which the terminal 100 is located, information about a cell to which the terminal 100 is connected, or the like.

According to various embodiments, the location service 332 may provide information about the location of the terminal 100, a service based on the information about the location of the terminal 100, or the like. The information about the location of the terminal 100 may include information about the current location of the terminal 100, movement information of the terminal 100 in a region of interest, or the like. Also, the service based on the information about the location of the terminal 100 may include a service based on the information about the current location of the terminal 100, a service based on the movement information of the terminal 100 in the region of interest, or the like. The location service 332 may provide information about the location of the terminal 100 and a service based on the information about the location of the terminal 100 to other services (e.g., the subscription service 331 and the cache service 333) of the MEC service 330, the edge application, the terminal 100, the service server 400, or the like.

According to various embodiments of the disclosure, the information about the location of the terminal 100 provided by the location service 332 may be obtained by the subscription service 331 from the 3GPP network 200. By obtaining information about the location of the terminal 100 through the 3GPP network 200, the location service 332 may obtain information about the location of the terminal 100 even when the terminal 100 does not turn on the GPS. Thus, the terminal 100 may not need to turn on the GPS in order to provide information about the location of the terminal 100 to the location service 332 and the power consumption of the terminal 100 may be reduced. A process of requesting, by the edge data network 300, the 3GPP network 200 for information about the location of the terminal 100 in order for the location service 332 to obtain information about the location of the terminal 100 will be described below in detail with reference to FIG. 6.

According to various embodiments, the information about the location of the terminal 100 provided by the location service 332 may be a combination of information about the location of the terminal 100 received from the 3GPP network 200 and information received from the terminal 100.

The information about the location of the terminal 100 may include GPS information of the terminal 100, information about a region in which the terminal 100 is located, information about a path through which the terminal 100 moves, information about a cell to which the terminal 100 is connected (or camped on), information about a cell to which the terminal 100 is to be handed over, or the like, and is not limited thereto and may include all information related to the location of the terminal 100. The location of the terminal 100 may be identified based on the information about the location of the terminal 100, and the location service 332 may provide the identified location of the terminal 100 to other services (e.g., the subscription service 331 and the cache service 333), the edge application, the service server 400, or the like.

According to various embodiments, in relation to the region of interest, the location service 332 may provide information about the location of the terminal 100 to other services (e.g., the subscription service 331 and the cache service 333), the edge application, the service server 400, or the like, and the region of interest may be pre-configured. The information about the location of the terminal 100 provided by the location service 332 in relation to the region of interest may be information about the relative location of the terminal 100 and the region of interest and may include, for example, movement information of the terminal 100 in the region of interest.

Here, the region of interest may include a geographic region related to an MEC service provided by the edge application or a service to be provided through the application client of the terminal 100. For example, the region of interest may be a geographic region including the location of a road, a building (e.g., a restaurant at a particular location), or the like related to an MEC service provided by the edge application or a service (e.g., an AR/VR game or a location-based information providing service) to be provided through the application client or the location of particular coordinates (e.g., the actual geographic coordinates of a building on an AR/VR game). However, the region of interest is not limited thereto and may also include a logical region divided or defined by a service. Also, the region of interest may be configured for each edge application.

According to various embodiments, the region of interest may be configured by the edge application, based on a service to be provided through the application client of the terminal 100. The service to be provided through the application client of the terminal 100 may include a service related to the location of the terminal 100 (e.g., a location-based AR/VR game of the terminal 100, a location-based information providing service of the terminal 100, or the like).

According to various embodiments, the region of interest may be configured by the service server 400, based on a service to be provided through the application client of the terminal 100. In this case, the region of interest may be configured in relation to the location service 332 while the service server 400 provides to the edge data network 300 the edge enabler server 320 capable of providing the location service 332.

According to various embodiments, the location service 332 may generate movement information of the terminal 100 in the region of interest based on information about the correspondence between the information about the location of the terminal 100 and the configured region of interest. According to various embodiments, the location service 332 may identify the information about the correspondence between the information about the location of the terminal 100 and the configured region of interest. The location service 332 may identify the information about the correspondence between the information about the location of the terminal 100 and the configured region of interest, based on the location of the terminal 100 identified through the information about the location of the terminal 100 (or a location change, an expected location, or an expected location change (path)). For example, based on the identified location (or the location change) of the terminal 100, the location service 332 may identify whether the terminal 100 is located in the region of interest, whether the location of the terminal 100 changes within the region of interest, or whether the terminal 100 has moved outside the region of interest.

According to various embodiments, the location service 332 may generate movement information of the terminal 100 in the region of interest based on information about the correspondence between the information about the identified location of the terminal 100 and the configured region of interest. The movement information of the terminal 100 in the region of interest may be at least one of information about the location of the terminal 100 in the region of interest, the movement path, the movement distance, or the movement speed thereof, or any combination thereof. According to various embodiments of the disclosure, the movement information of the terminal 100 in the region of interest may include information indicating that the terminal is located in the region of interest, information indicating that the terminal enters the region of interest, information indicating that the terminal exits the region of interest, or information indicating that the terminal moves from a first region of interest to a second region of interest in the region of interest, or the like.

According to various embodiments, the location service 332 may trigger another service based on the movement information of the terminal 100 in the region of interest. In this case, the location service 332 may determine a service to be triggered based on the movement information of the terminal 100 in the region of interest and may request to provide the determined service to the terminal 100 or the like while providing the movement information of the terminal 100 in the region of interest to another service (e.g., the cache service 333) providing the determined service.

According to various embodiments, a location-based service triggering rule (hereinafter referred to as a service triggering rule) in which the movement information of the terminal 100 in the region of interest and a particular service (e.g., a cache service) are mapped may be configured in relation to the location service 332. The location service 332 may trigger a service corresponding to the movement information of the terminal 100 in the region of interest, based on the service triggering rule. The service triggering rule may be configured for each edge application, and a plurality of mapping information obtained by mapping the movement information of the terminal 100 and a particular service may be configured in the form of a list. The particular service triggered based on the service triggering rule may include an MEC service provided by the MEC service 330 of the edge enabler server 320, an MEC service provided by the edge application, or the like.

According to various embodiments, the configured service triggering rule may include a cache service triggering rule. The cache service triggering rule may include information obtained by mapping the movement information of the terminal 100 in the region of interest and the cache service. For example, when the cache service triggering rule is configured to trigger a particular service when the terminal 100 enters the region of interest, the location service 332 may transmit information indicating that the terminal 100 enters the region of interest to the cache service 333 in response to the information indicating that the terminal 100 enters the region of interest and trigger the cache service.

According to various embodiments, the cache service 333 may cache and provide data from the service server 400. The caching may refer, for example, to a technology of providing data with low latency in response to a request for data by pre-obtaining and storing data from a server providing data before there is a request for data. Herein, caching may refer to a series of processes of requesting the service server 400 for data provided by the service server 400 and then pre-storing the data before there is a request of the terminal 100 or the application client. The edge data network 300 may reduce the network transmission latency by pre-storing data to be provided to the terminal 100 through caching in the edge data network 300 located closer than the service server 400.

According to various embodiments, the cache service 333 may cache data determined based on a configured cache rule from the service server 400. Here, the cache rule may include information obtained by mapping particular information and data to be cached from the service server 400. According to various embodiments of the disclosure, the particular information may be information for triggering caching and may be, for example, movement information of the terminal 100 in the region of interest or information about an event that occurred or is occurring in the terminal 100 (e.g., call reception, application client termination, user input, or the like).

According to various embodiments, the cache rule may include information obtained by mapping the movement information of the terminal 100 in the region of interest and the data cached from the service server 400. Here, the data to be cached according to the cache rule may be data related to information mapped to the data to be cached. For example, the data mapped to the movement information of the terminal 100 in the region of interest according to the cache rule may include data about the terminal 100 or a service to be provided to the terminal 100 (or the application client of the terminal 100) according to the movement of the terminal 100 in the region of interest. The cache rule may be configured for each edge application, and a plurality of cache rules may be configured in the form of a list.

According to various embodiments, the cache rule may be configured by the edge application, based on a service to be provided through the application client of the terminal 100. The service to be provided through the application client of the terminal 100 may include a service related to the location of the terminal 100 (e.g., a location-based AR/VR game of the terminal 100, a location-based information providing service of the terminal 100, or the like).

According to various embodiments, the cache rule may be configured by the service server 400, based on a service to be provided through the application client of the terminal 100. In this case, the cache rule may be configured in relation to the cache service while the service server 400 provides to the edge data network 300 the edge enabler server 320 capable of providing the cache service 333.

According to various embodiments, based on the movement information of the terminal 100 in the region of interest and the cache rule, the cache service 333 may determine data to be cached from the service server 400 and cache the determined data from the service server 400. The cache service 333 may identify data mapped to the movement information of the terminal 100 in the region of interest and determine the identified data as data to be cached. According to various embodiments, the data to be cached by the edge data network 300 may include data related to a service provided by the application client of the terminal 100 from the edge data network 300.

According to various embodiments, the cache service 333 may request the service server 400 for the data determined to be cached. The cache service 333 may transmit information about the requested data together while transmitting a data request message to the service server 400. For example, the data request message may include identification information about the terminal 100 to which the requested data is to be provided, identification information about an application client (e.g., an AR/VR game App or a location-based information providing App) of the terminal 100 in which the requested data is to be used or a service (e.g., an AR/VR game service or a location-based information providing service), location information of the terminal 100, or the like.

According to various embodiments, the cache service 333 may receive a response message including the requested data from the service server 400 in response to the data request message transmitted to the service server 400. For example, when the cache service 333 requests content (e.g., image, video, audio, or the like) related to an AR/VR game, a response message including the requested content may be received from the service server 400.

According to various embodiments of the disclosure, the response message received by the cache service 333 from the service server 400 in response to the data request message may include information about the requested data. For example, the information about the requested data may include identification information of the requested data, a list of the requested data, identification information of the terminal 100, or the like.

According to various embodiments, the cache service 333 may store the data received from the service server 400 in a storage space in the edge data network 300 or a storage space connected to the edge data network 300.

According to various embodiments, the cache service 333 may determine a storage period of the data cached from the service server 400. The cache service 333 may dynamically determine the storage period of the cached data. For example, the cache service 333 may dynamically determine the storage period based on the memory usage of a storage space in which the cached data is stored, the movement information of the terminal 100 requesting the cached data in the region of interest related to the cached data, or the like. After the cache service 333 caches and stores data, when the storage period of the cached data has elapsed, the cached data may be deleted from the storage space.

According to various embodiments, the cache service 333 may determine the storage period of the cached data based on the capacity of the cached data and the memory usage of the storage space storing the cached data. For example, the cache service 333 may determine the storage period of the cached data in proportion to the memory usage of the storage space storing the cached data. For example, the cache service 333 may determine the storage period of the cached data to be shorter as the memory usage of the storage space increases.

According to various embodiments, the cache service 333 may determine the storage period of the cached data based on the movement information of the terminal 100 in the region of interest related to the cached data. For example, the cache service 333 may determine the storage period of the cached data based on the number of terminals 100 that have activated the application client requesting the cached data and are located in the region of interest related to the cached data or a region adjacent to the region of interest. The cache service 333 may determine a weight differently according to the relative distance from the region of interest of the terminal 100 that has activated the application client requesting the cached data (e.g., the greater the relative distance, the lower the weight) and determine the storage period of the cached data by multiplying the determined weight by the number of terminals 100.

According to various embodiments, the edge application may access the storage space of the edge data network 300 through the edge enabler server 320. For example, the edge application may access the storage space of the edge data network 300 through the edge enabler server 320 in order to provide an MEC service to the terminal 100. The data cached by the cache service 333 from the service server 400 may be stored in the storage space of the edge data network 300.

According to various embodiments, the edge application may receive a request for data from the terminal 100 and transmit the requested data to the terminal 100. For example, when the data requested by the terminal 100 is data pre-cached by the edge data network 300, the edge application may transmit the pre-stored cached data to the terminal 100. Also, when the data requested by the terminal 100 is non-cached data, the edge application may receive data from the service server 400 and transmit the received data to the terminal 100.

According to various embodiments, the service server 400 may provide content related to an application (e.g., an application client or an edge application). For example, the service server 400 may be managed by a content provider that provides content to the terminal 100. The edge data network 300 may transmit/receive data for providing an MEC service to/from the service server 400 and may pre-cache data from the service server 400.

Figure 4B:
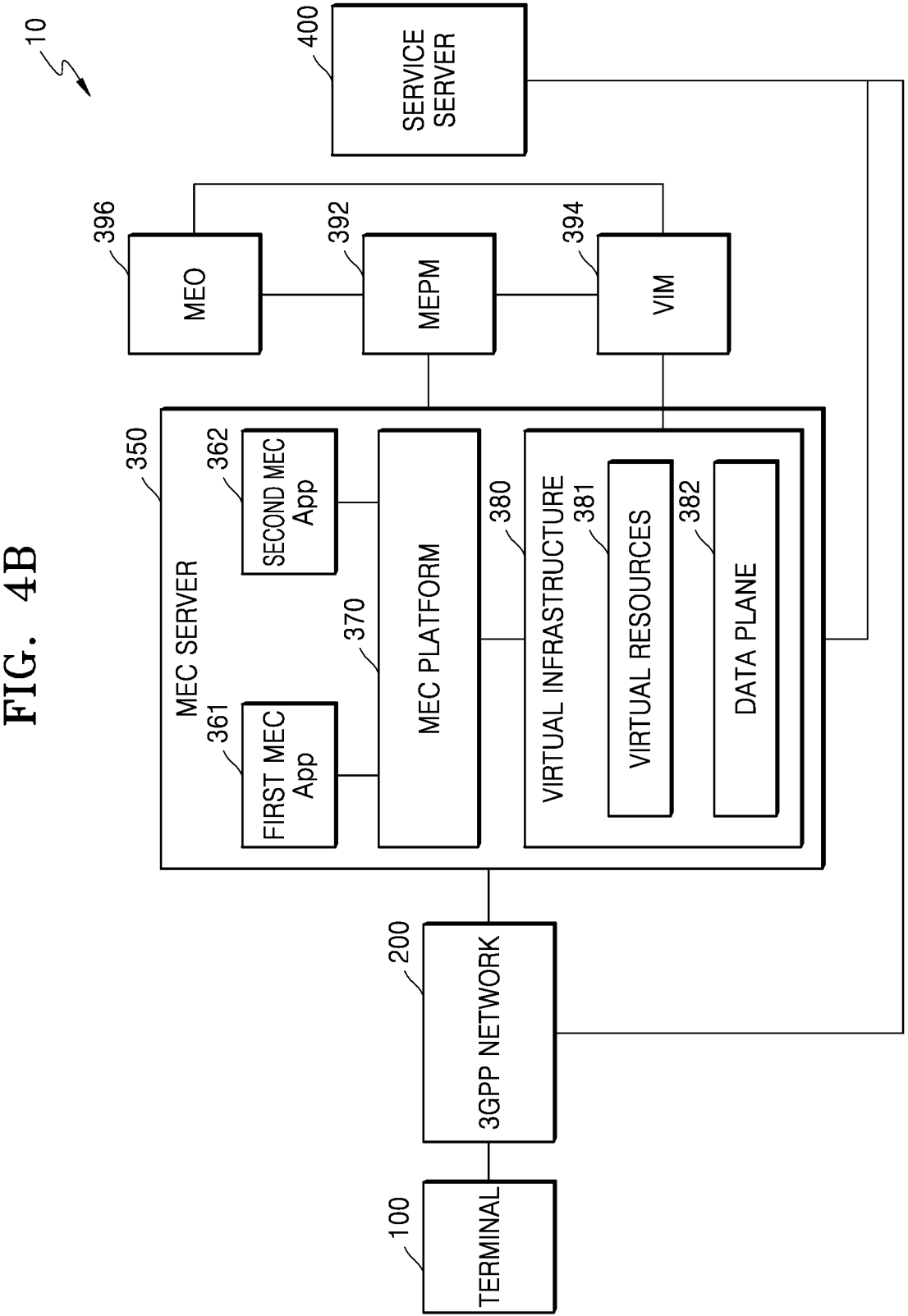
FIG. 4B is a block diagram illustrating an example network environment for supporting an MEC-based service according to various embodiments.

FIG. 4B is a block diagram illustrating an example network environment for supporting an MEC-based service according to various embodiments.

According to various embodiments, the components of FIG. 4B may correspond to the components of FIG. 4A. For example, an MEC server 350, first and second MEC Apps 361 and 362, and an MEC platform 370 of FIG. 4B may respectively correspond to the edge data network 300, the first and second edge applications 311 and 312, and the edge enabler server 320 of FIG. 4A. Hereinafter, in the description of FIG. 4B, redundant descriptions of the components overlapping with those of FIG. 4A will be omitted for conciseness.

Referring to FIG. 4B, an MEC system may include an MEC server 350, a mobile edge platform manager (MEPM) 392, a virtualization infrastructure manager (VIM) 394, and a mobile edge orchestrator (MEO) 396. However, the configuration included in the MEC system is not limited thereto. Each of the components included in the MEC system may refer to a physical entity unit or may refer to a software or module unit capable of performing an individual function. According to various embodiments, the MEC server 350 may include a plurality of MEC Apps (e.g., a first MEC App 361 and a second MEC App 362), an MEC platform 370, and a virtual infrastructure 380. However, the configuration of the MEC server 350 is not limited thereto.

According to various embodiments of the disclosure, the virtual infrastructure 380 may include a virtual resource 381 and a data plane 382. The virtual infrastructure 380 may provide the virtual resource 381 to the MEC App. The virtual resource 381 may include, for example, at least one of a computing resource, a storage resource, or a network resource (e.g., a network bandwidth) that may be used by the MEC App. The MEC App of the MEC server 350 may be driven as a virtual machine on the virtual infrastructure 380.

According to various embodiments, the data plane 382 may execute a traffic rule received by the MEC platform 370 and route traffic between an applications, a service, a DNS server/proxy, a 3GPP network 200, a local network, and an external network.

According to various embodiments, the MEPM 392 may manage the life cycle of MEC Apps operating in the MEC server 350 and transmit information related to the life cycle to the MEO 396. According to other embodiments, the MEPM 392 may manage or transmit information for operating the MEC Apps to the MEC platform 370. The information for operating the MEC Apps may include, for example, at least one of an application's rule, a requirement, a service approval, or a traffic rule.

According to various embodiments, the VIM 394 may allocate, manage, or release the virtual resources 381 of the virtual infrastructure 380 required to execute the MEC App in the MEC server 350.

According to various embodiments, the MEO 396 may manage and maintain an overall function of data transmission based on the MEC system. The MEO 396 may manage and maintain an overall function of MEC-based data transmission based on at least one of a resource available in the MEC system, an available MEC service, an application's rule and requirement, an operator's policy, or a topology. For example, the MEO 396 may select an MEC server suitable for the UE App of the terminal 100 or trigger or terminate the instantiation of the UE App.

Figure 5:
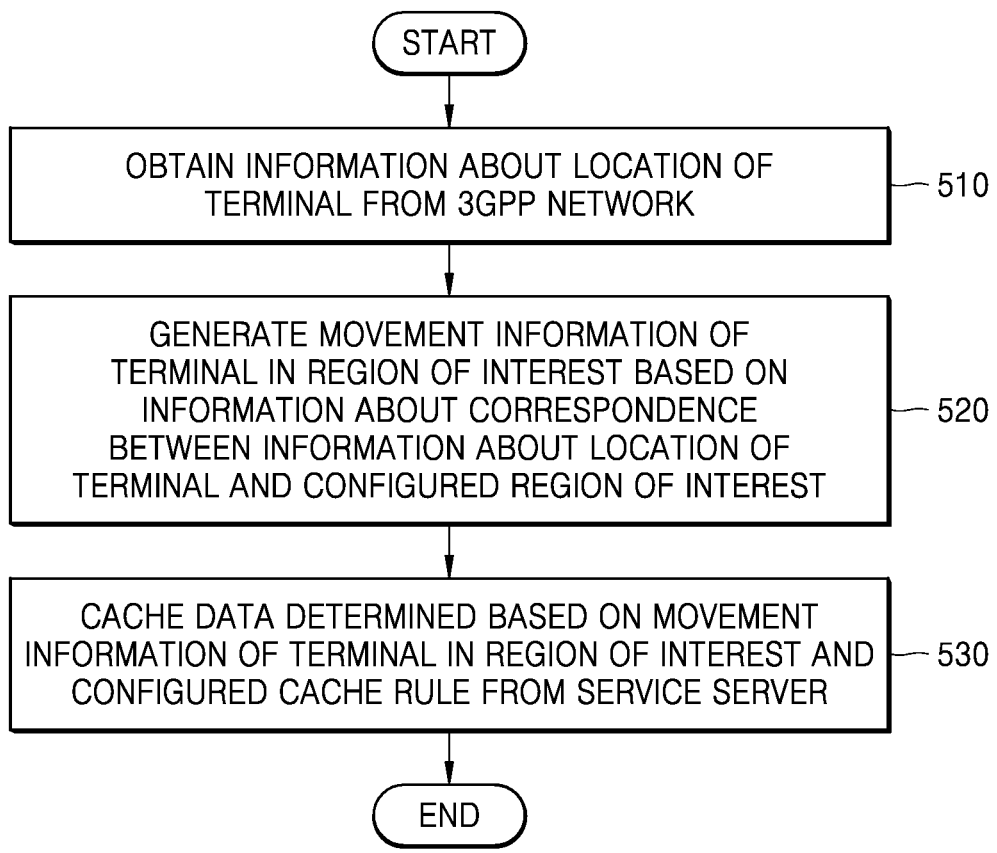
FIG. 5 is a flowchart illustrating an example method of caching, by an edge data network, data from a service server based on information about the location of a terminal, according to various embodiments.

FIG. 5 is a flowchart illustrating an example method of caching, by an MEC server, data from a service server based on information about the location of a terminal according to various embodiments.

Referring to FIG. 5, in operation 510, the edge data network 300 may obtain information about the location of the terminal 100 from the 3GPP network 200. According to various embodiments, operation 510 may correspond to the operations discussed with reference to FIG. 4A in which the edge enabler server 320 (or the subscription service 331 or the location service 332) obtains information about the location of the terminal 100 from the 3GPP network 200.

According to various embodiments, the edge data network 300 may request the 3GPP network 200 (or the NEF 225 of the 3GPP network 200) for information about the location of the terminal 100 to obtain information about the location of the terminal 100 from the 3GPP network 200.

In operation 520, the edge data network 300 may generate movement information of the terminal 100 in the region of interest based on information about the correspondence between the information about the location of the terminal 100 and the configured region of interest. According to various embodiments, operation 520 may correspond to the operations discussed with reference to FIG. 4A in which the edge enabler server 320 (or the location service 332) generates movement information of the terminal 100 in the region of interest.

According to various embodiments, the movement information of the terminal 100 in the region of interest may include information indicating that the terminal is located in the region of interest, information indicating that the terminal enters the region of interest, information indicating that the terminal exits the region of interest, or information indicating that the terminal moves from a first region of interest to a second region of interest in the region of interest, or the like.

In operation 530, the edge data network 300 may cache data determined based on the movement information of the terminal 100 in the region of interest and the configured cache rule, from the service server 400. According to various embodiments, operation 530 may correspond to the operations discussed with reference to FIG. 4A in which the edge enabler server 320 (or the cache service 333) caches data from the service server 400.

According to various embodiments, the edge data network 300 may determine data to be cached from the service server 400, based on the movement information of the terminal 100 in the region of interest and the configured cache rule. The edge data network 300 may request the service server 400 for the data determined to be cached. The edge data network 300 may receive data from the service server 400 in response to the request. The edge data network 300 may store the cached data in a storage space in the edge data network 300 or a storage space connected to the edge data network 300.

Figure 6:
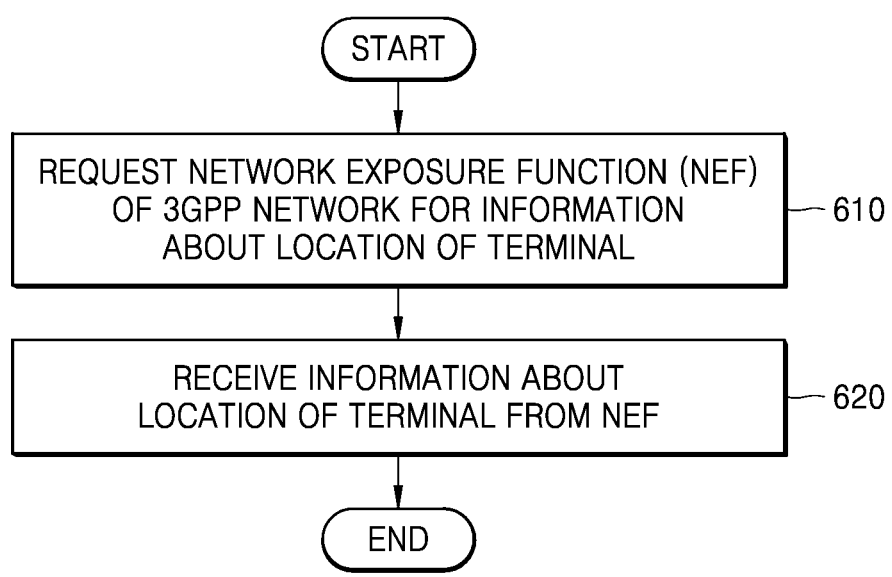
FIG. 6 is a flowchart illustrating an example method of obtaining, by an edge data network, information about the location of a terminal from a 3GPP network, according to various embodiments.

FIG. 6 is a flowchart illustrating an example method of obtaining, by an MEC server, information about the location of a terminal from a 3GPP network according to various embodiments. According to various embodiments, the operations of FIG. 6 may correspond to the operations discussed with reference to FIG. 4A in which the edge enabler server 320 (or the subscription service 331) obtains information about the location of the terminal 100 from the NEF 225.

Referring to FIG. 6, in operation 610, the edge data network 300 may request the NEF 225 of the 3GPP network 200 for information about the location of the terminal.

According to various embodiments, the edge data network 300 may request the NEF 225 for a subscription for the report of an event (event reporting) related to the location of the terminal 100 provided by the NEF 225.

In operation 620, the edge data network 300 may receive information about the location of the terminal 100 from the NEF 225.

According to various embodiments, the edge data network 300 may receive a report of an event including information about the location of the terminal 100 from the NEF 225. The edge data network 300 may obtain information about the location of the terminal 100 through the report of the NEF 225.

Figure 7:
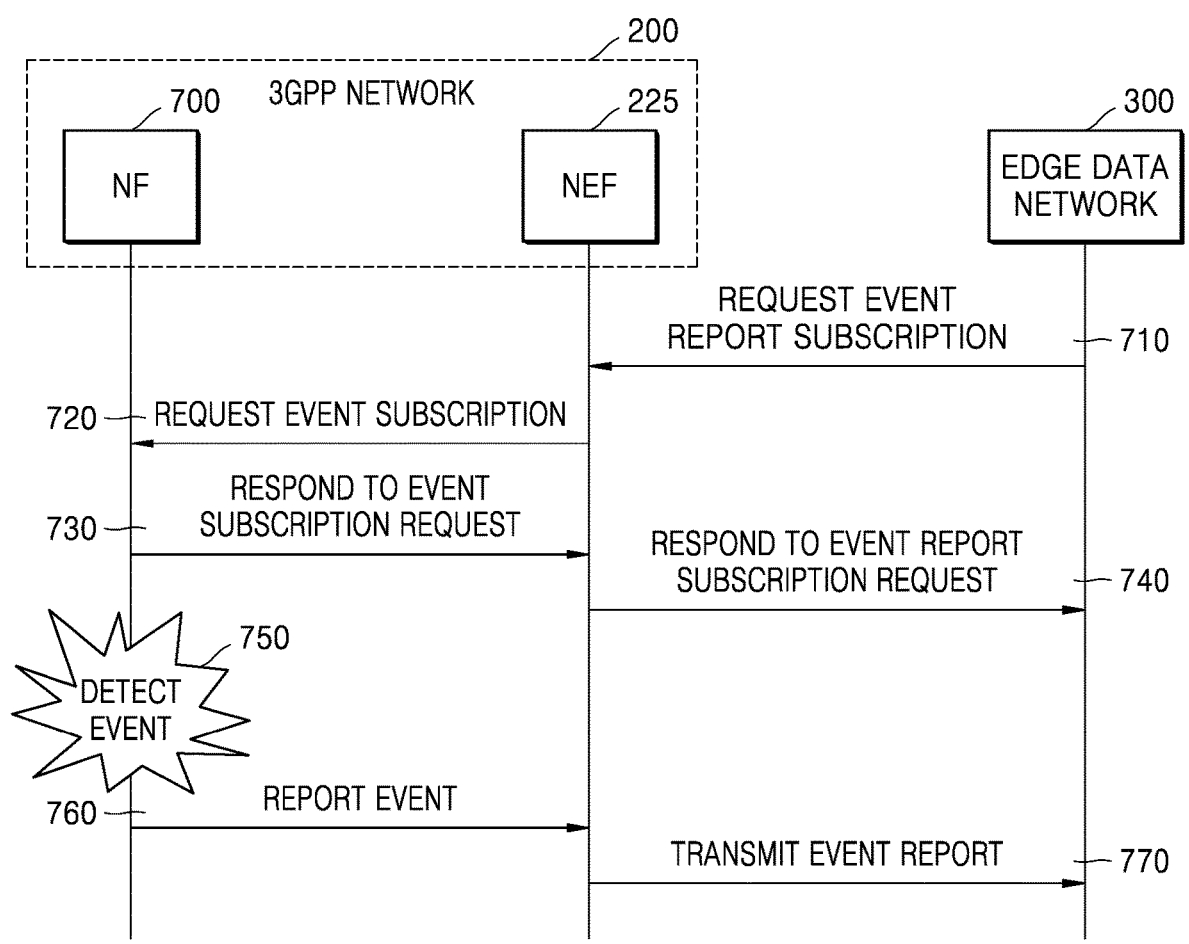
FIG. 7 is a signal flow diagram illustrating an example method of obtaining, by an edge data network, information about the location of a terminal, according to various embodiments.

FIG. 7 is a signal flow diagram illustrating an example method of obtaining, by an edge data network, information about the location of a terminal according to various embodiments.

Referring to FIG. 7, in operation 710, the edge data network 300 may request the NEF 225 of the 3GPP network 200 for a subscription for the report of an event related to the location of the terminal 100. The edge data network 300 may transmit information about an event report method to the NEF 225 together with a subscription request on the report of an event.

In operation 720, the NEF 225 may request an NF 700, which detects an event related to the location of the terminal 100 in the 3GPP network 200, for a subscription for an event related to the location of the terminal 100.

In operation 730, the NF 700 may transmit a response message to the event subscription request to the NEF 225. The NF 700 may notify, through the response message, the NEF 225 that the subscription for the event has been initiated.

In operation 740, the NEF 225 may transmit a response message to a subscription request on the report of an event related to the location of the terminal 100 of the edge data network 300. The NEF 225 may notify, through the response message, the edge data network 300 that the subscription has been initiated.

In operation 750, the NF 700 may detect an event related to the location of the terminal 100. In operation 760, the NF 700 may report the detected event to the NEF 225. The report of the NF 700 on the event may include information about the location of the terminal 100.

In operation 770, the NEF 225 may transmit the report of the event received from the NF 700 to the edge data network 300. The report of the event received by the edge data network 300 may include information about the location of the terminal 100.

Figure 8:
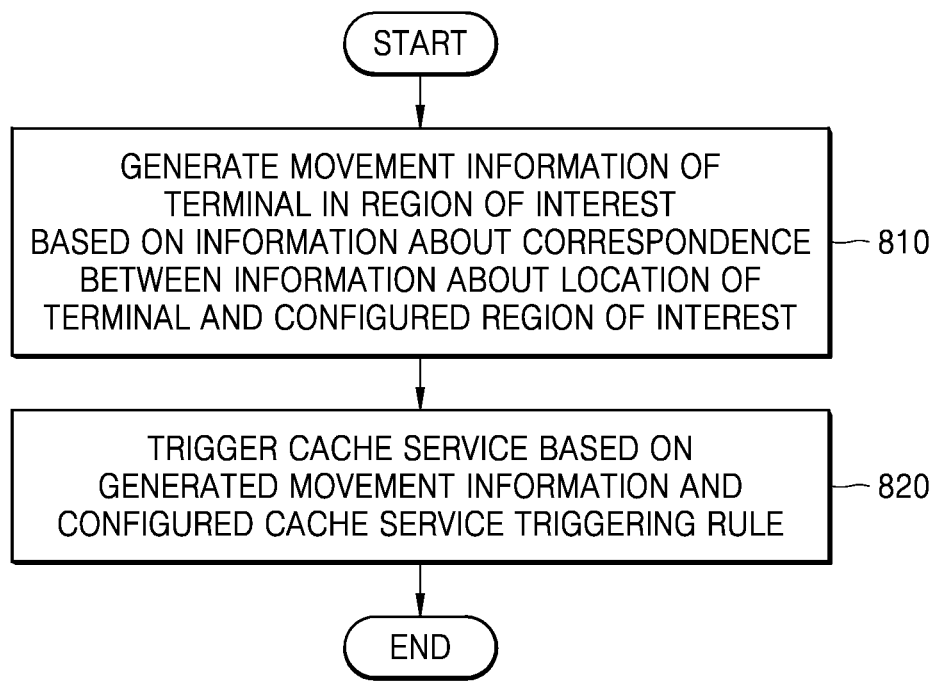
FIG. 8 is a flowchart illustrating an example method of triggering, by an edge data network, a cache service based on movement information of a terminal in a region of interest, according to various embodiments.

FIG. 8 is a flowchart illustrating an example method of triggering, by an edge data network, a cache service based on movement information of a terminal in a region of interest, according to various embodiments.

Referring to FIG. 8, in operation 810, the edge data network 300 may generate movement information of the terminal 100 in the region of interest based on information about the correspondence between the information about the location of the terminal 100 and the configured region of interest. According to various embodiments, operation 810 may correspond to the operations discussed with reference to FIG. 4A in which the edge enabler server 320 (or the location service 332) generates movement information of the terminal 100 in the region of interest.

In operation 820, the edge data network 300 may trigger a cache service based on the generated movement information and the configured cache service triggering rule. According to various embodiments, operation 820 may correspond to the operations discussed with reference to FIG. 4A in which the edge enabler server 320 (or the location service 332 and the cache service 333) triggers a cache service.

According to various embodiments of the disclosure, the edge data network 300 may determine whether to trigger a cache service, based on the generated movement information of the terminal 100 in the region of interest according to the cache service triggering rule. For example, the cache service triggering rule may be configured to trigger a cache service when the terminal 100 enters the region of interest, and when the generated movement information is information indicating that the terminal 100 enters the region of interest, the edge data network 300 may trigger a cache service. When the cache service is triggered, the edge data network 300 may cache data from the service server 400 based on the movement information of the terminal 100 in the region of interest and the configured cache rule.

Figure 9:
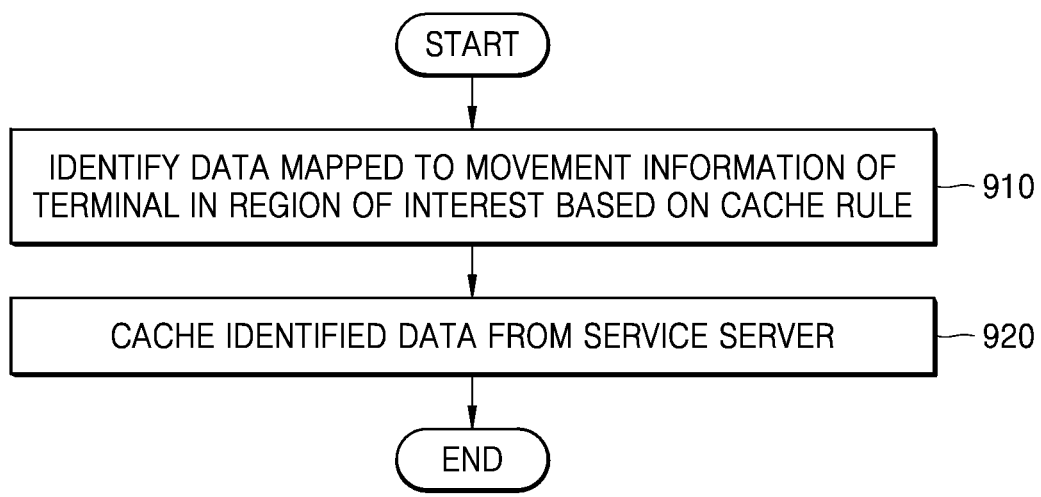
FIG. 9 is a flowchart illustrating an example method of caching, by an edge data network, data from a service server based on a cache rule, according to various embodiments.

FIG. 9 is a flowchart illustrating an example method of caching, by an edge data network, data from a service server based on a cache rule according to various embodiments. According to various embodiments, the operations of FIG. 9 may correspond to the operations discussed with reference to FIG. 4A in which the edge enabler server 320 (or the cache service 333) caches data from the service server 400.

Referring to FIG. 9, in operation 910, the edge data network 300 may identify data mapped to the movement information of the terminal 100 in the region of interest, based on the cache rule.

According to various embodiments, the edge data network 300 may identify data mapped to the movement information of the terminal 100 in the region of interest according to the cache rule and may determine the identified data as data to be cached.

In operation 920, the edge data network 300 may cache the identified data from the service server 400.

According to various embodiments, the edge data network 300 may request the service server 400 for the identified data. The edge data network 300 may receive the requested data from the service server 400 in response to the request. Also, the edge data network 300 may receive information about the requested data (e.g., identification information of the requested data, a list of the requested data, identification information of the terminal 100, or the like) from the service server 400 together with the requested data.

According to various embodiments, the edge data network 300 may store the cached data in the storage space in the edge data network 300 or the storage space connected to the edge data network 300.

Figure 10:
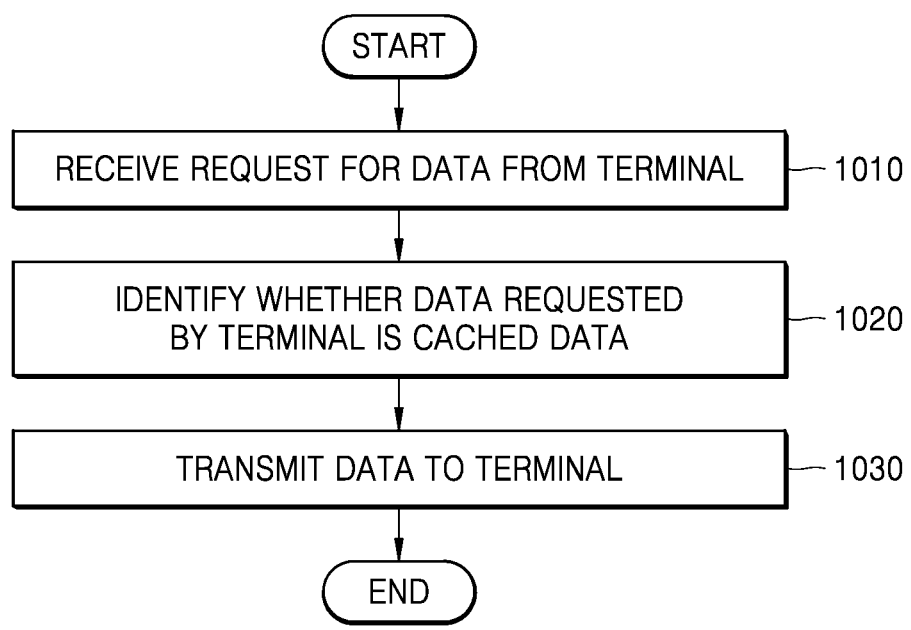
FIG. 10 is a flowchart illustrating an example method of transmitting, by an edge data network, data requested by a terminal, according to various embodiments.

FIG. 10 is a flowchart illustrating an example method of transmitting, by an edge data network, data requested by a terminal according to various embodiments. According to various embodiments, the operations of FIG. 10 may correspond to the operations discussed with reference to FIG. 4A in which the edge enabler server 320 (or the edge application) transmits data to the terminal 100.

In operation 1010, the edge data network 300 may receive a request for data from the terminal 100.

According to various embodiments, the data requested by the terminal 100 may be data necessary to drive the application client of the terminal 100. The data necessary to drive the application client of the terminal 100 may include data about a screen, sound, information, or the like necessary to drive the application client. For example, when the application client of the terminal 100 is an AR/VR game App or a location-based information providing service App, the data requested by the terminal 100 may be data to be displayed on a game screen or data about a service to be provided according to the current location of the terminal 100.

According to various embodiments, the data requested by the terminal 100 may be data related to a service to be provided to the terminal 100 as the terminal 100 moves in the region of interest. For example, when the application client of the terminal 100 is an AR/VR game App, the data requested by the terminal 100 may be data related to a screen on the game to be provided to the terminal 100 as the terminal 100 moves in the region of interest (e.g., a region including a particular location on the game) configured in relation to the AR/VR game.

According to various embodiments, the edge data network 300 may receive a request for data from the terminal 100 according to the location change of the terminal 100 or the reception of a user's input related to the application client driven in the terminal 100.

According to various embodiments, the request of the terminal 100 for the data may be transmitted to the edge application in the edge data network 300 that provides an MEC service to the application client that requires the requested data.

In operation 1020, the edge data network 300 may identify whether the data requested by the terminal 100 is cached data.

According to various embodiments, the edge data network 300 may identify whether the data requested by the terminal 100 is pre-cached. For example, the edge data network 300 may search for a space in which data pre-cached from the service server 400 is stored and identify whether the data requested by the terminal 100 is stored.

According to various embodiments, whether the data requested by the terminal 100 is pre-cached may be identified by accessing the cache service 333 by the edge application in the edge data network 300. When the data requested by the terminal 100 is pre-cached, the edge application may receive the data requested by the terminal 100 from the cache service 333. Alternatively, the edge application may receive information about a location at which the requested data is stored from the cache service 333 and access a storage space in which the data requested by the terminal 100 is stored based on the received information.

In operation 1030, the edge data network 300 may transmit data to the terminal 100.

According to various embodiments, when the data requested by the terminal 100 is cached data, the edge data network 300 may transmit the pre-stored cached data to the terminal 100.

According to various embodiments, when the data requested by the terminal 100 is non-cached data, the edge data network 300 may request the service server 400 to transmit the data requested by the terminal 100. The edge data network 300 may receive data from the service server 400 and transmit the same to the terminal 100.

Figure 11:
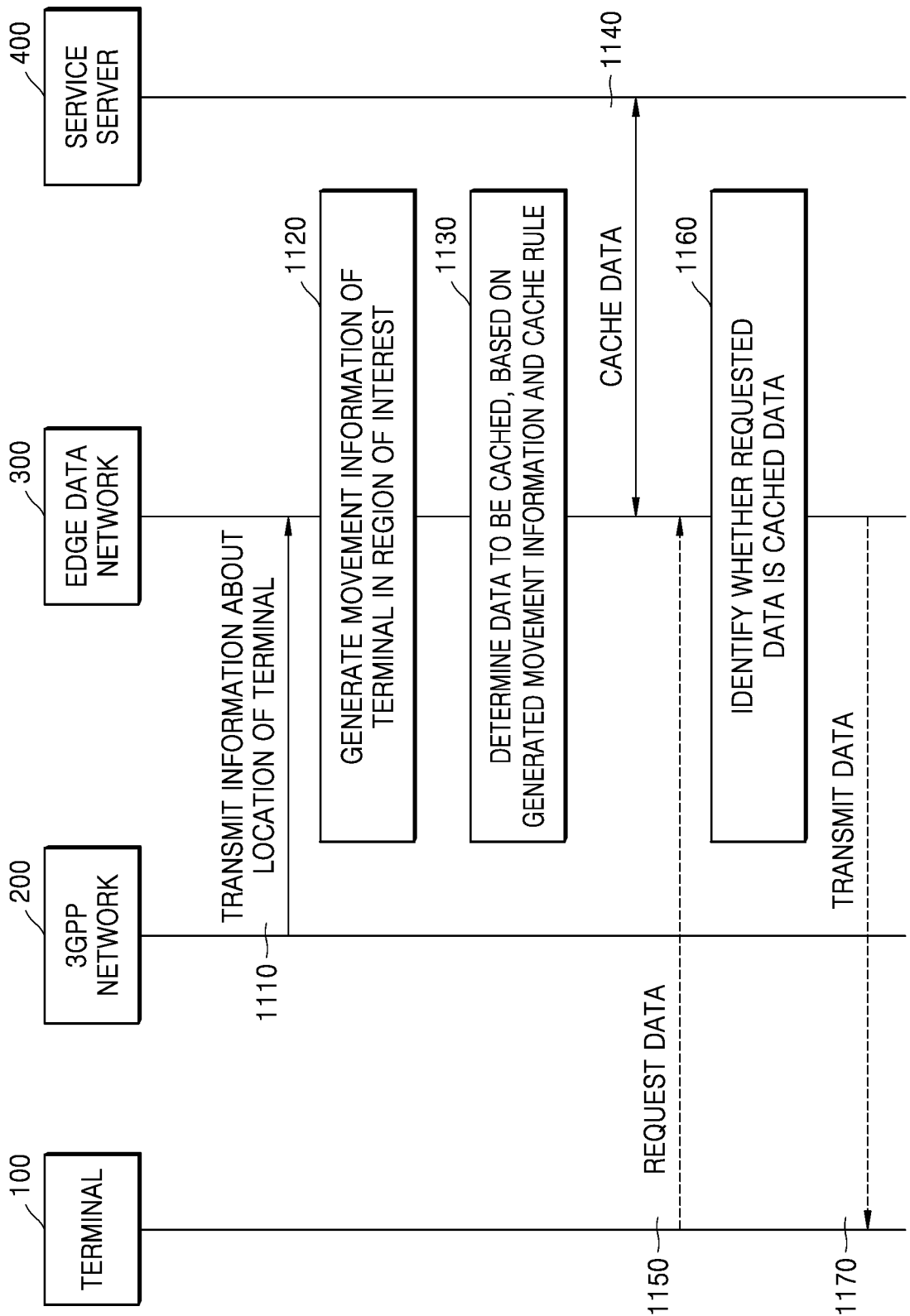
FIG. 11 is a signal flow diagram illustrating an example method of caching, by an edge data network, data from a service server based on information about the location of a terminal, according to various embodiments.

FIG. 11 is a signal flow diagram illustrating an example method of caching, by an edge data network, data from a service server based on information about the location of a terminal according to various embodiments.

Referring to FIG. 11, in operation 1110, the 3GPP network 200 may transmit information about the location of the terminal 100 to the edge data network 300. In this case, the information about the location of the terminal 100 may, for example, be included in the report of the NEF 225 of the 3GPP network 200 on an event related to the location of the terminal 100 and transmitted to the edge data network 300.

In operation 1120, the edge data network 300 may generate movement information of the terminal 100 in the region of interest based on information about the correspondence between the information about the location of the terminal 100 and the configured region of interest.

In operation 1130, the edge data network 300 may determine data to be cached from the service server 400, based on the movement information of the terminal 100 in the region of interest and the configured cache rule.

In operation 1140, the edge data network 300 may cache the data determined to be cached from the service server 400.

In operation 1150, the terminal 100 may request the edge data network 300 for data.

In operation 1160, the edge data network 300 may identify whether the data requested by the terminal 100 is cached data.

In operation 1170, when the data requested by the terminal 100 is cached data, the edge data network 300 may transmit the pre-stored cached data to the terminal 100. Also, when the data requested by the terminal 100 is non-cached data, the edge data network 300 may request the service server 400 to transmit the data requested by the terminal 100, receive the data from the service server 400, and transmit the same to the terminal 100.

Figure 12:
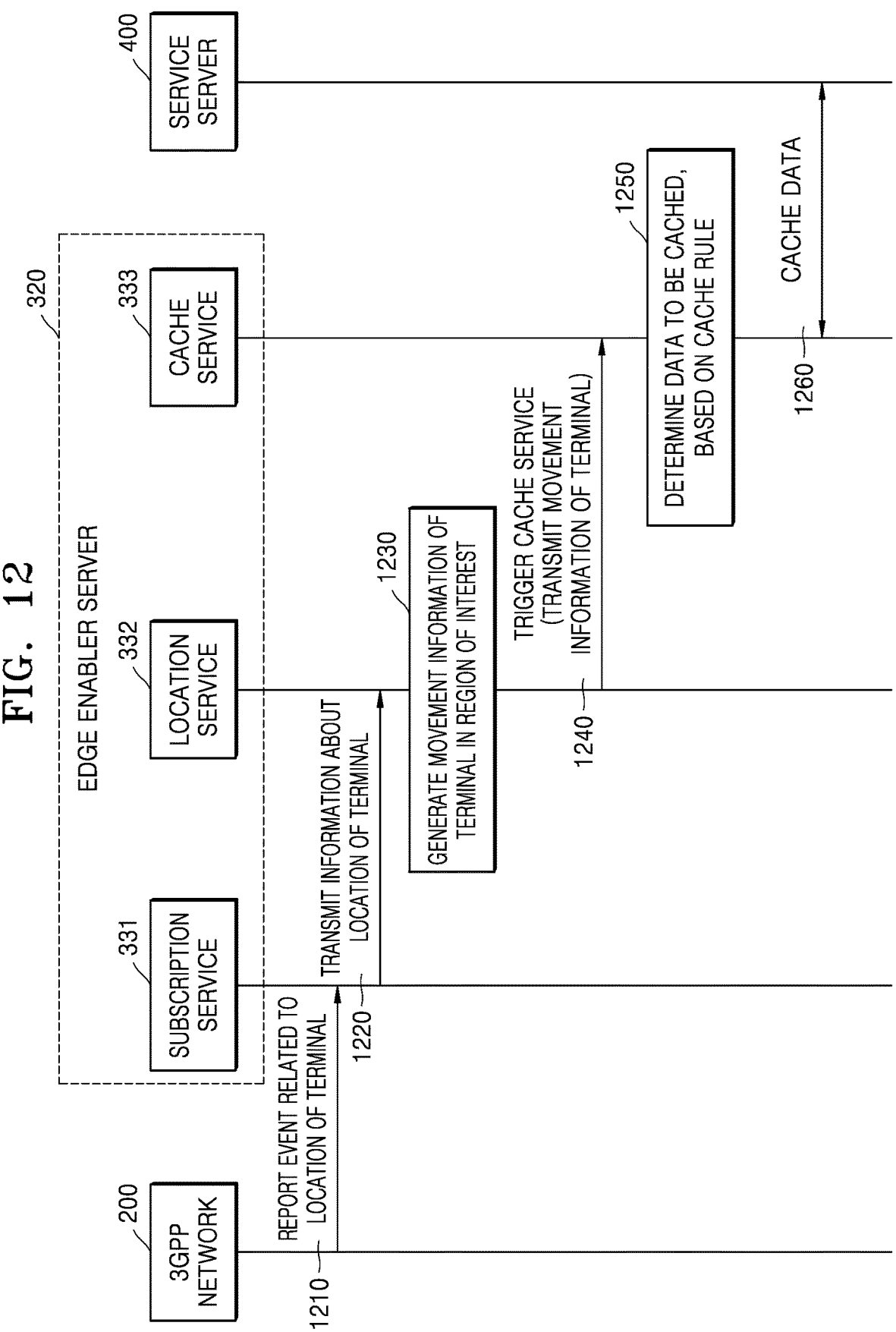
FIG. 12 is a signal flow diagram illustrating an example method of caching, by an edge enabler server of an edge data network, data from a service server based on information about the location of a terminal, according to various embodiments.

FIG. 12 is a signal flow diagram illustrating an example method of caching, by an MEC platform of an edge data network, data from a service server based on information about the location of a terminal according to various embodiments.

As described above with reference to FIG. 4A, the edge data network 300 may include the edge enabler server 320 that provides an MEC service to the edge application. The MEC service 330 of the edge enabler server 320 may provide a subscription service 331, a location service 332, and a cache service 333 to the edge application. The subscription service 331, the location service 332, and the cache service 333 provided by the MEC service 330 of the edge enabler server 320 may, for example, be respectively implemented as a subscription service module, a location service module, and a cache service module that perform individual functions.

According to various embodiments, in FIG. 12, a method of caching data from the service server 400 by the edge data network 300 based on information about the location of the terminal 100 (operations 1110 to 1140 of FIG. 11) will be described in detail based on the operation of each of the services provided by the edge enabler server 320 included in the edge data network 300.

Referring to FIG. 12, in operation 1210, the 3GPP network 200 may report an event related to the location of the terminal 100 to the subscription service 331. The report of the event related to the location of the terminal 100 may include information about the location of the terminal 100.

In operation 1220, the subscription service 331 may transmit the information about the location of the terminal 100 obtained from the 3GPP network 200 to the location service 332.

In operation 1230, the location service 332 may generate movement information of the terminal 100 in the region of interest based on information about the correspondence between the information about the location of the terminal 100 and the configured region of interest.

In operation 1240, the location service 332 may trigger a cache service based on the movement information of the terminal 100 in the region of interest and the configured cache service triggering rule. Here, the cache service may be triggered by transmitting the movement information of the terminal 100 in the region of interest from the location service 332 to the cache service 333.

In operation 1250, the cache service 333 may determine data to be cached by identifying data mapped to the movement information of the terminal in the region of interest based on the cache rule.

In operation 1260, the cache service 333 may cache the data determined to be cached from the service server 400.

Figure 13:
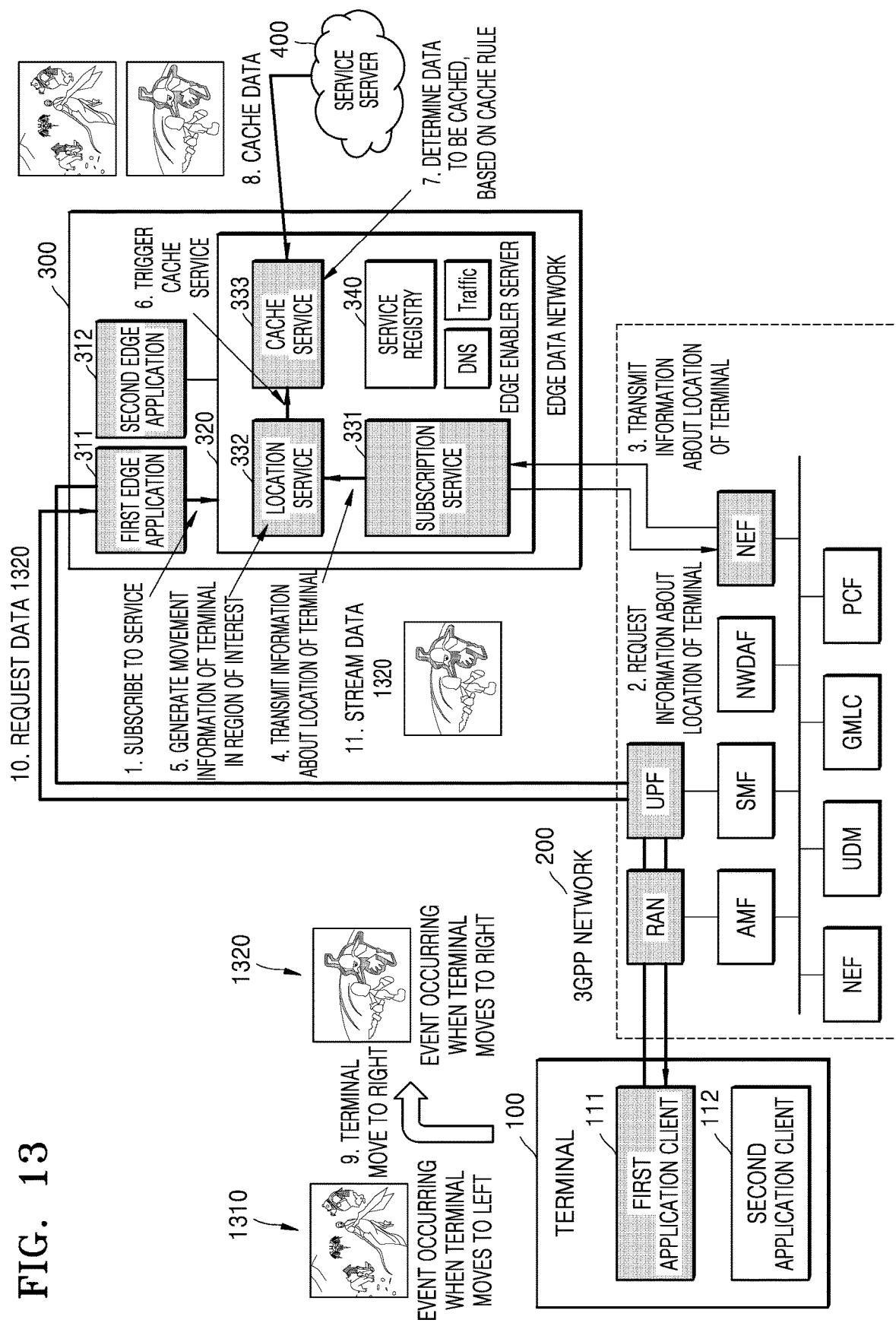
FIG. 13 is a diagram illustrating an example method of caching, by an edge data network, data from a service server based on information about the location of a terminal, according to various embodiments.

FIG. 13 is a diagram illustrating an example method of caching, by an edge data network, data from a service server based on information about the location of a terminal according to various embodiments.

Referring to FIG. 13, the terminal 100 may include a first application client 111 and a second application client 112. Among them, the terminal 100 may execute the first application client 111 that provides a service for an AR or VR game. In a state in which the terminal 100 has executed the first application client 111, in the cases of moving to the left and to the right from the current location, different game screens (screen 1310 in the case of moving to the left, screen 1320 in the case of moving to the right) may be displayed on the terminal 100.

The first edge application 311 providing an MEC service to the first application client 111 may retrieve and subscribe to a subscription service, a location service, and a cache service in the service registry 340 of the edge enabler server 320 in order to pre-cache data to be provided to the first application client 111. When at least one of the subscription service, the location service, or the cache service is not retrieved, the first edge application 311 may newly register a non-retrieved service in the edge enabler server 320. The subscription service 331, the location service 332, and the cache service 333 subscribed to by the first edge application 311 may be respectively implemented as modules that perform individual functions.

The subscription service 331 may request the 3GPP network 200 for information about the location of the terminal 100 and receive information indicating that the terminal 100 is located in a particular region from the 3GPP network 200. The subscription service 331 may transmit the obtained information about the location of the terminal 100 to the location service 332.

The location service 332 may generate information indicating that the terminal 100 is located in the region of interest, based on information about the correspondence between the information about the location of the terminal 100 and the configured region of interest. Here, the region of interest may be pre-configured as a region within a certain distance from a location in the real world corresponding to a particular location on the game executed through the first application client 111.

The location service 332 may trigger a cache service based on the information indicating that the terminal 100 is located in the region of interest and the configured cache service triggering rule. In this case, the cache service triggering rule may be pre-configured to trigger a cache service when the terminal 100 is located in the region of interest. According to various embodiments, the cache service triggering rule may include information obtained by mapping the movement information of the terminal 100 in the region of interest and the cache service. The cache service may be triggered by transmitting the information indicating that the terminal 100 is located in the region of interest, from the location service 332 to the cache service 333.

Based on the information that the terminal 100 is located in the region of interest and the cache rule, the cache service 333 may determine data to be cached from the service server 400 as data about the game screens 1310 and 1320 to be displayed by the terminal 100 as the terminal 100 moves to the left or the right from the current location. In this case, the cache rule may be pre-configured to cache data about the screen displayed on the terminal 100 as the terminal 100 moves to the left or the right from the current location when the terminal 100 is located in the region of interest.

The cache service 333 may cache the data determined to be cached from the service server 400. The cache service 333 may transmit a message requesting the data determined to be cached to the service server 400. The request message transmitted by the cache service 333 may include information about the data determined to be cached, information about the terminal 100, and information about the first application client 111 of the terminal 100. The cache service 333 may receive the requested data from the service server 400 in response to the transmitted request message and store the received data. The cache service 333 may receive, from the service server 400, identification information of the requested data, a list of the requested data, identification information of the terminal 100, or the like as information about the requested data together with the requested data.

When the terminal 100 moves to the right or the left, data to be displayed on the screen of the terminal 100 by the service to be provided according to the movement of the terminal 100 may need to be displayed on the screen without latency. As the terminal 100 moves to the right from the current location, the terminal 100 may request the edge data network 300 (or the first edge application 311) for data about the screen 1320 displayed as the terminal 100 moves to the right from the current location.

The edge data network 300 (or the first edge application 311) may stream (or transmit), to the terminal 100 through the 3GPP network 200, data about the screen 1320 displayed as the terminal 100 moves to the right from the current location, that is, data corresponding to movement information to the right of the terminal 100 (i.e., the data requested by the terminal), among the pre-stored cached data.

For example, the first edge application 311 may receive the data requested by the terminal from the edge enabler server 320 (or the cache service 333) and stream the same to the terminal 100. Also, the first edge application 311 may receive information about a location at which the data requested by the terminal 100 is stored from the edge enabler server 320 (or the cache service 333), obtain data based on the received information, and stream the same to the terminal 100. Thus, while being located close to the terminal 100, the edge data network 300 may pre-cache data about a service to be provided according to the movement of the terminal 100 from the service server 400 located far from the terminal 100, thereby providing necessary data to the terminal 100 without (or with reduced) latency according to the movement of the terminal 100.

Figure 14:
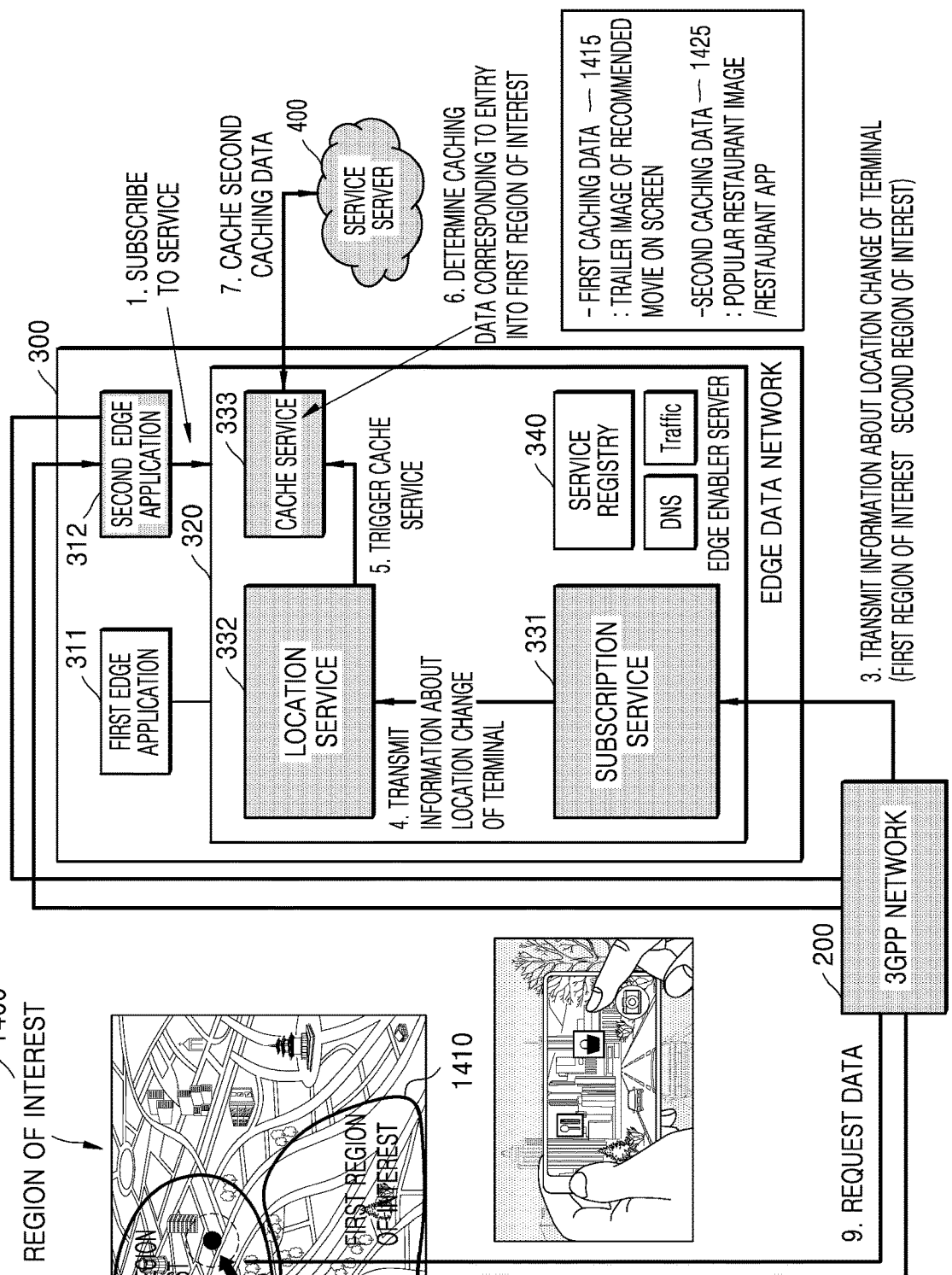
FIG. 14 is a diagram illustrating an example method of caching, by an edge data network, data from a service server based on information about the location of a terminal, according to various embodiments.

FIG. 14 is a diagram illustrating an example method of caching, by an edge data network, data from a service server based on information about the location of a terminal according to various embodiments. Hereinafter, in the description of FIG. 14, redundant descriptions overlapping with FIG. 4A or 13 will be omitted for conciseness.

Referring to FIG. 14, the terminal 100 may be in a state of having executed a second application client (not illustrated) that provides information about convenience facilities (e.g., restaurants, movie theaters, convenience stores, or the like) around the terminal 100. The second edge application 312 may provide an MEC service to the second application client in relation to the location of the terminal 100.

Referring to FIG. 14, the terminal 100 may move from a first region of interest 1410 to a second region of interest 1420 in a region of interest 1400. The 3GPP network 200 may transmit information about the location change of the terminal 100 from the first region of interest 1410 to the second region of interest 1420 to the subscription service 331 of the edge enabler server 320 in the edge data network 300.

The subscription service 331 may be in a state of subscribing to the report of the 3GPP network 200 about a location change event of the terminal 100. The subscription service 331 may transmit information about the location change of the terminal 100 from the first region of interest 1410 to the second region of interest 1420 to the location service 332.

The location service 332 may generate information indicating that the terminal 100 enters the second region of interest 1420, based on information about the correspondence between the information about the location change of the terminal 100 and the region of interest. The location service 332 may trigger a cache service based on the information indicating that the terminal 100 enters the second region of interest 1420 and the cache triggering rule.

Based on the information indicating that the terminal 100 enters the second region of interest 1420 and the cache rule, the cache service 333 may determine data to be cached from the service server 400 as second caching data 1425 related to the second region of interest 1420. The cache rule may be pre-configured to cache first caching data 1415 related to the first region of interest 1410 (e.g., a recommended movie trailer image being screened in a movie theater located in the first region of interest 1410) when the terminal 100 enters the first region of interest 1410. Also, the cache rule may be pre-configured to cache second caching data 1425 related to the second region of interest 1420 (e.g., an image about a popular restaurant in the second region of interest 1420, a restaurant App, or the like) when the terminal 100 enters the second region of interest 1420.

The cache service 333 may cache the second caching data 1425 determined to be cached from the service server 400. In this case, the cache service 333 may cache information about the second caching data 1425 together with the second caching data 1425.

As the terminal 100 moves in the second region of interest 1420 and is located within a certain radius from the popular restaurant in the second region of interest 1420, the terminal 100 may request the edge data network 300 (or the second edge application 312) for data about the popular restaurant in the second region of interest 1420 (e.g., a popular restaurant image, a restaurant App, or the like). The edge data network 300 may transmit (or stream), to the terminal 100 through the 3GPP network 200, the second caching data 1425 (e.g., an image about a popular restaurant in the second region of interest 1420, a restaurant App, or the like), that is, data corresponding to a popular restaurant in the second region of interest 1420, among the pre-stored cached data.

Figure 15:
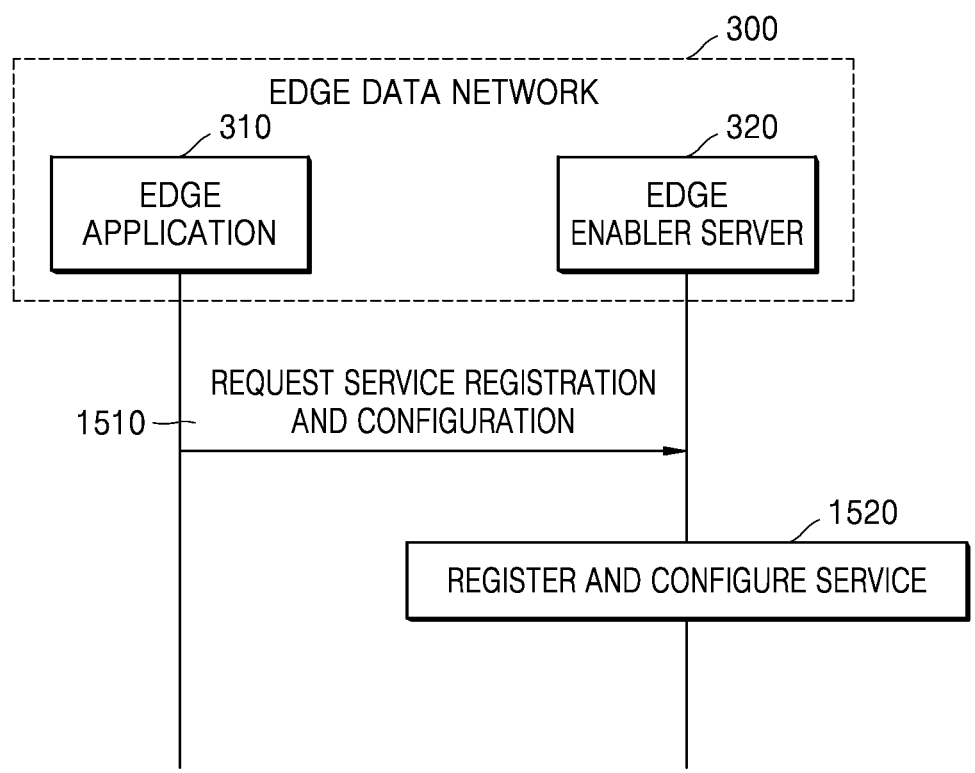
FIG. 15 is a signal flow diagram illustrating an example method of registering and configuring, by an edge application, an MEC service, according to various embodiments.

FIG. 15 is a signal flow diagram illustrating an example method of registering and configuring, by an edge application, an MEC service according to various embodiments.

Referring to FIG. 15, in operation 1510, the edge application 310 included in the edge data network 300 may request the edge enabler server 320 for a service registration and configuration.

According to various embodiments, the edge application 310 may request the edge enabler server 320 for the registration of an MEC service. For example, the edge application 310 may request the edge enabler server 320 for the registration of a subscription service, a location service, and a cache service. Here, the MEC service the registration of which is requested by the edge application 310 may be an MEC service that is provided by the edge application to the terminal 100 or the application client in relation to a service to be provided through the application client of the terminal 100.

According to various embodiments of the disclosure, the edge application 310 may transmit information related to the MEC service to be registered to the edge enabler server 320. The edge application 310 may transmit the information related to the MEC service to the edge enabler server 320 and request the edge enabler server 320 to configure the MEC service to be registered based on the transmitted information. In this case, the information transmitted to the edge enabler server 320 may be information for configuring MEC services (e.g., the region of interest, the cache rule, and the like) in relation to the service to be provided through the application client of the terminal 100.

According to various embodiments, the edge application 310 may request a registration and configuration of a subscription service and transmit information about a subscription method for an event report to be subscribed to the edge enabler server 320 in relation to the subscription service. For example, while requesting a registration and configuration of a subscription service, the edge application 310 may transmit information about the number of event reports, the report period, the report periodicity information, the report periodicity, or the like to the edge enabler server 320.

According to various embodiments, the edge application 310 may request a registration and configuration of a location service and transmit information about the region of interest, information obtained by mapping movement information of the terminal 100 in the region of interest and a particular service, or the like to the edge enabler server 320. The information obtained by mapping the movement information of the terminal 100 in the region of interest and the particular service may include information obtained by mapping the movement information of the terminal 100 in the region of interest and the cache service (i.e., the cache service triggering rule).

According to various embodiments, the edge application 310 may request a registration and configuration of the cache service and transmit information about the cache rule to the edge enabler server 320. Here, the cache rule may include information obtained by mapping particular information and data to be cached from the service server 400.

In operation 1520, the edge enabler server 320 may register the MEC service the registration and configuration of which is requested by the edge application 310 in the service registry. The MEC service registered in the service registry may be configured based on the information related to the MEC service transmitted by the edge application 310 to the edge enabler server 320.

For example, the edge enabler server 320 may register the subscription service in the service registry, and a subscription method for an event report to be subscribed may be configured in relation to the subscription service. Also, the edge enabler server 320 may register the location service in the service registry, and the region of interest and the information obtained by mapping the movement information of the terminal 100 in the region of interest and the particular service, or the like may be configured in relation to the location service. Also, the edge enabler server 320 may register the cache service in the service registry, and the cache rule may be configured in relation to the cache service.

Figure 16:
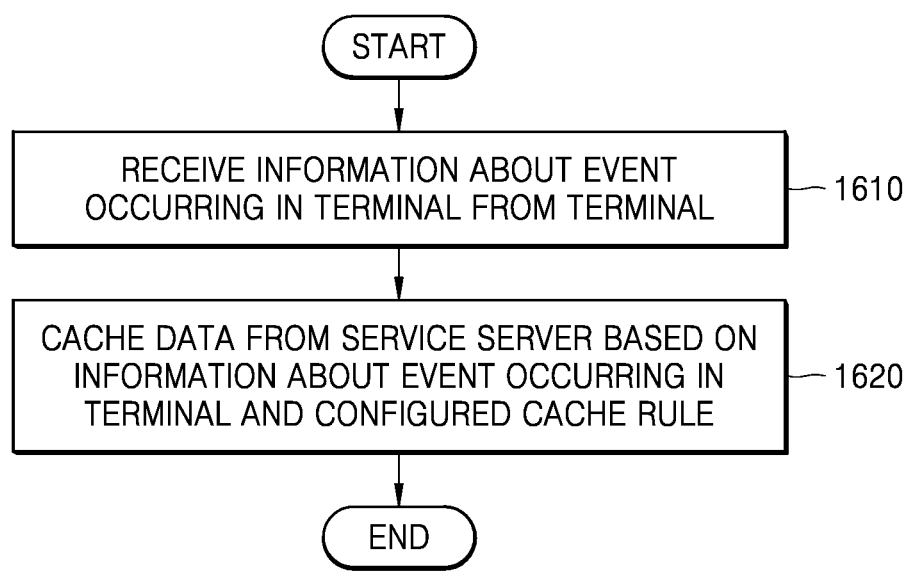
FIG. 16 is a flowchart illustrating an example method of caching, by an edge data network, data from a service server based on information about an event occurred in a terminal, according to various embodiments.

FIG. 16 is a flowchart illustrating an example method of caching, by an edge data network, data from a service server based on information about an event occurred in a terminal according to various embodiments.

Referring to FIG. 16, in operation 1610, the edge data network 300 may receive information about an event that occurred in the terminal 100 from the terminal 100.

According to various embodiments, the event that occurred in the terminal 100 may mean a particular state of the terminal 100, a particular situation occurring in the terminal 100, or an event occurring in a particular situation. Also, the event that occurred in the terminal 100 may be an event occurring in a state in which the application client is executed in the terminal 100 or in a state in which a service is provided through the application client. For example, the event that occurred in the terminal 100 may include an event in which a phone call is received in a state in which the application client is executed in the terminal 100, an event in which the executed application client is terminated, an input event about the terminal 100 of the user related to the executed application client, or the like.

According to various embodiments, the edge data network 300 may receive information about the event that occurred in the terminal 100 from the terminal 100 through the UPF 221 of the 3GPP network 200.

In operation 1620, the edge data network 300 may cache the data determined based on the information about the event that occurred in the terminal 100 and the cache rule from the service server 400.

According to various embodiments, the edge data network 300 may determine data to be cached from the service server 400, based on the information about the event that occurred in the terminal 100 and the configured cache rule. According to various embodiments, the cache rule may include information obtained by mapping the information about the event that occurred in the terminal 100 and the data cached from the service server 400. For example, when an event in which a phone call is received occurs in a state in which the application client is executed in the terminal 100, the cache rule may be configured to cache data about a service to be provided through the application client after the termination of the phone call.

According to various embodiments of the disclosure, the edge data network 300 may request the service server 400 for the data determined to be cached. The edge data network 300 may receive data from the service server 400 in response to the request and store the same. The data cached by the edge data network 300 may be stored in the storage space in the edge data network 300 or the storage space connected to the edge data network 300.

For example, the edge data network 300 may cache data about a service to be provided through the application client from the service server 400. The edge data network 300 that has pre-cached the data may rapidly transmit the requested data to the terminal 100 when the terminal 100 terminates the received phone call, resumes the service provision through the running application client, and then requests the data.

Figure 17:
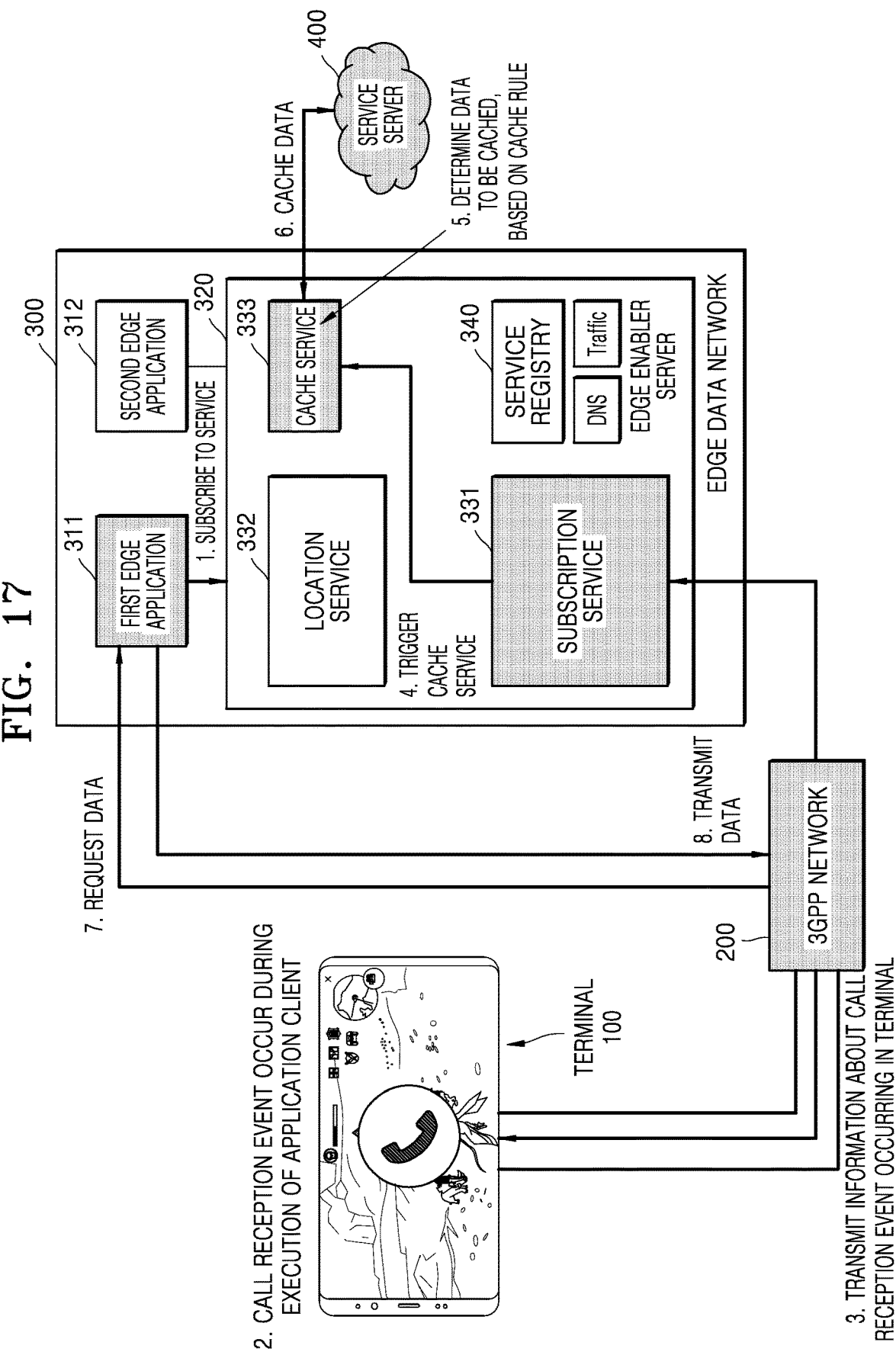
FIG. 17 is a diagram illustrating an example method of caching, by an edge data network, data from a service server based on information about an event occurred in a terminal, according to various embodiments.

FIG. 17 is a diagram illustrating an example method of caching, by an edge data network, data from a service server based on information about an event occurred in a terminal according to various embodiments.

Referring to FIG. 17, a call reception event may occur in a state in which the application client is executed in the terminal 100. The application client executed in the terminal 100 may be an application client that receives an MEC service from the first edge application 311. The first edge application 311 may provide an MEC service (e.g., the cache service) to the terminal 100 through the edge enabler server 320 in relation to the application client. The first edge application 311 may retrieve and subscribe to the subscription service 331 and the cache service 333 in the service registry 340 of the edge enabler server 320 in order to pre-cache data to be provided to the application client.

The terminal 100 may transmit information about the call reception event that occurred in the terminal 100 to the edge data network 300 (or the subscription service 331 of the edge enabler server 320). The information about the call reception event may include information indicating that a phone call is received in a state in which the application client is executed in the terminal 100, information indicating that the application client executed by the call reception is stopped, or the like. In this case, the information about the call reception event transmitted by the terminal 100 may be transmitted to the edge data network 300 through the UPF 221 of the 3GPP network 200.

The subscription service 331 of the edge enabler server 320 may be in a state of subscribing to the report of the terminal 100 on an event occurring in the terminal 100 according to the configuration of the first edge application 311. The subscription service 331 may trigger the cache service based on the information about the call reception event occurred in the terminal 100 and the configured cache service triggering rule.

In this case, the cache service triggering rule may be configured such that the subscription service 331 may trigger the cache service when a call reception event occurs in the terminal 100. The cache service may be triggered by transmitting, by the subscription service 331, information indicating that a call reception event has occurred in the terminal 100 to the cache service 333.

The cache service 333 may determine data to be cached from the service server 400, based on the information indicating that a call reception event has occurred in the terminal 100 and the configured cache rule. For example, according to the cache rule, when a call reception event occurs in the terminal 100, the cache service 333 may determine data to be cached as data related to a service to be provided through the application client after the termination of the phone call in the terminal 100.

The cache service 333 may cache the determined data from the service server 400. The cache service 333 may transmit a message requesting the data determined to be cached to the service server 400. The request message transmitted by the cache service 333 may include information about the data determined to be cached, information about the terminal 100, and information about the application client of the terminal 100. The cache service 333 may receive the requested data from the service server 400 in response to the transmitted request message and store the requested data. The cache service 333 may receive, from the service server 400, identification information of the requested data, a list of information included in the requested data, identification information of the terminal 100, or the like as information about the requested data together with the requested data.

When the received phone call is terminated in the terminal 100, the terminal 100 may re-provide a service through the running application client. When the received phone call is terminated in the terminal 100, the terminal 100 may request the edge data network 300 (or the first edge application 311) for data necessary for the service provision through the running application client. Among the data cached and pre-stored by the edge data network 300, data on a service to be provided through the application client after the termination of the phone call of the terminal 100 may be transmitted (or streamed) to the terminal 100 through the 3GPP network 200.

For example, the first edge application 311 may receive the data requested by the terminal from the edge enabler server 320 (or the cache service 333) and stream (or transmit) the same to the terminal 100. Also, the first edge application 311 may receive information about a location at which the data requested by the terminal 100 is stored from the edge enabler server 320 (or the cache service 333), obtain data based on the received information, and transmit the same to the terminal 100.

Thus, while being located close to the terminal 100, the edge data network 300 may pre-cache data to be provided to the terminal 100 in response to the event that occurred in the terminal 100 from the service server 400 located far from the terminal 100, thereby providing necessary data to the terminal 100 without (or with reduced) latency in response to the event occurred in the terminal 100.

Figure 18:
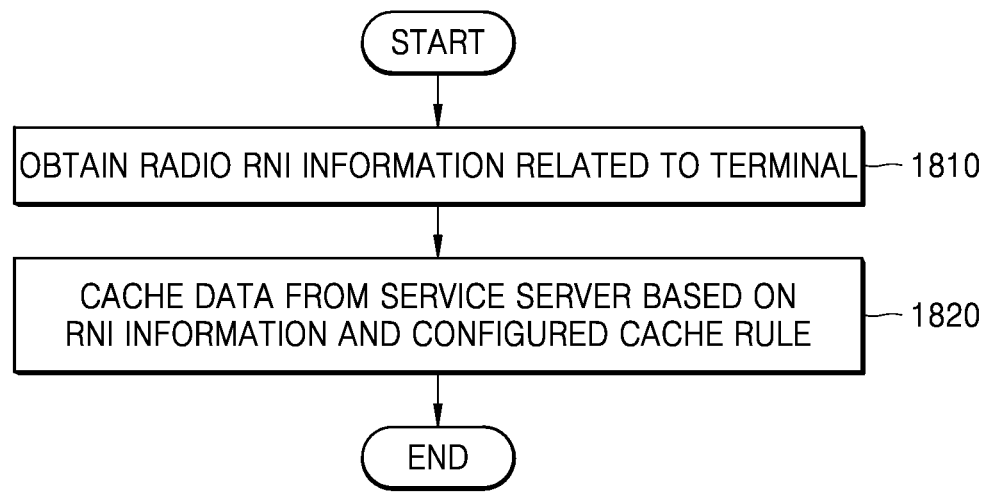
FIG. 18 is a flowchart illustrating an example method of caching, by an edge data network, data from a service server based on radio network information (RNI) related to a terminal, according to various embodiments.

FIG. 18 is a flowchart illustrating an example method of caching, by an edge data network, data from a service server based on radio network information (RNI) related to a terminal according to various embodiments.

Referring to FIG. 18, in operation 1810, the edge data network 300 may obtain radio network information (RNI) information related to the terminal 100.

According to various embodiments, the edge data network 300 may obtain RNI information related to the terminal 100 through an RNI service provided by the edge enabler server 320 in the edge data network 300. According to various embodiments, the edge data network 300 may subscribe to a report of an event related to the RNI exposed by the NEF 225 of the 3GPP network 200 and receive a report including the RNI related to the terminal 100 from the NEF 225.

According to various embodiments, the RNI related to the terminal 100 may include information about the state of the network to which the terminal 100 is connected, information about the context of the terminal 100 (UE context), information about the bearer of the terminal 100, or the like.

In operation 1820, the edge data network 300 may cache data from the service server 400 based on the RNI information related to the terminal 100 and the configured cache rule.

According to various embodiments, the edge data network 300 may determine data to be cached from the service server 400, based on the RNI information related to the terminal 100 and the configured cache rule. Here, the cache rule may include RNI information related to the terminal 100 or information obtained by mapping information about the network state of the terminal 100 determined based on the RNI information and data cached from the service server 400. For example, the cache rule may be pre-configured to cache different data according to the good and poor network states of the terminal 100.

For example, based on the cache rule, when the edge data network 300 determines that the network state of the terminal 100 is good according to the RNI information related to the terminal 100, the edge data network 300 may determine a service requiring a large amount of data (e.g., a delicate and complex service) among the services that may be provided through the application client of the terminal 100, as data to be cached. Also, based on the cache rule, when the edge data network 300 determines that the network state of the terminal 100 is poor, the edge data network 300 may determine data about a service requiring only a small amount of data of the terminal 100 (e.g., a simple service) as data to be cached.

According to various embodiments, the edge data network 300 may request the service server 400 for the data determined to be cached. The edge data network 300 may receive data from the service server 400 in response to the request and store the same. The data cached by the edge data network 300 may be stored in the storage space in the edge data network 300 or the storage space connected to the edge data network 300.

Figure 19:
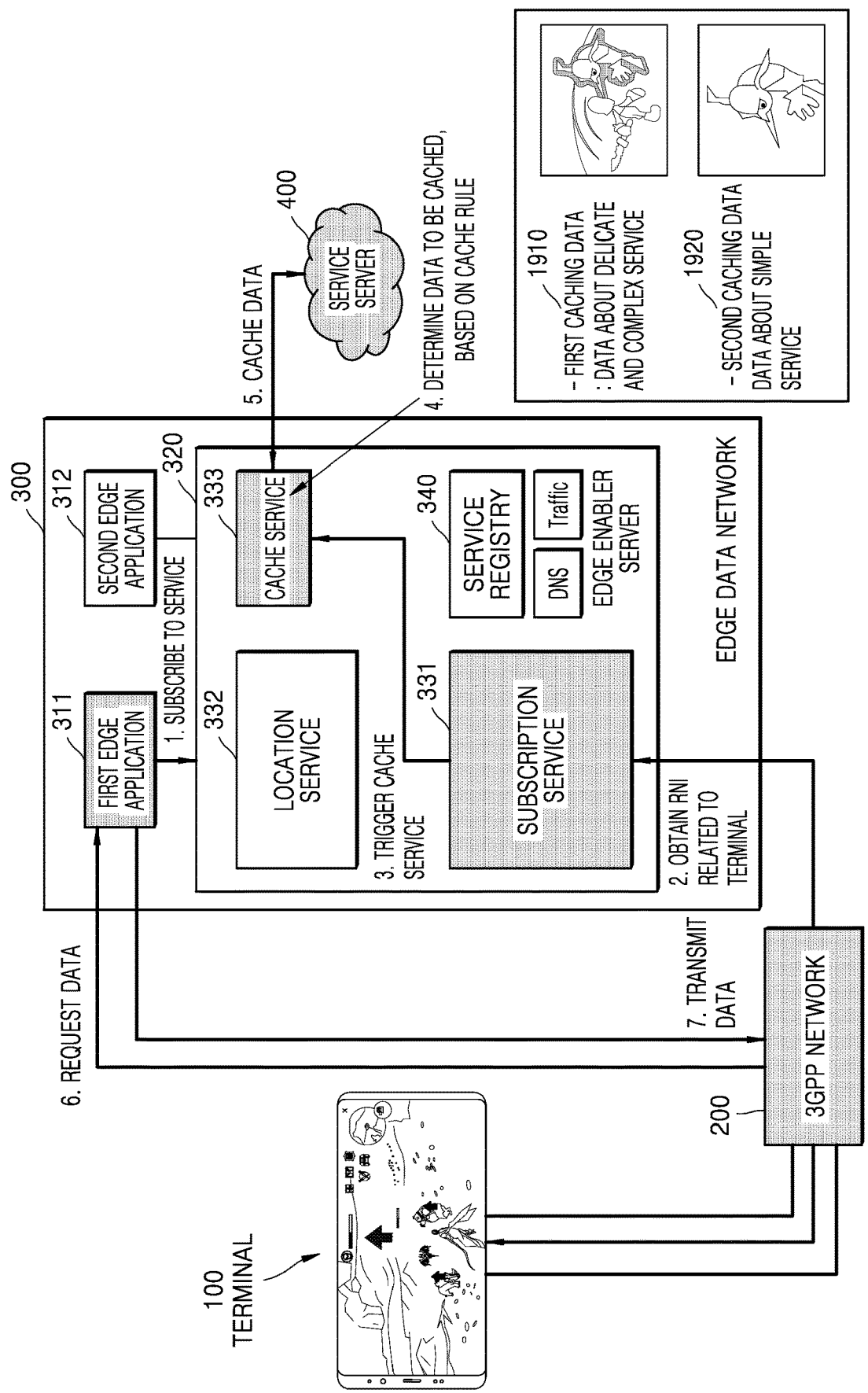
FIG. 19 is a diagram illustrating an example method of caching, by an edge data network, data from a service server based on RNI related to a terminal, according to various embodiments.

FIG. 19 is a diagram illustrating an example method of caching, by the edge data network 300, data from a service server based on RNI related to a terminal according to various embodiments.

Referring to FIG. 19, the application client providing a game service may be executed in the terminal 100. The application client executed in the terminal 100 may be an application client that receives an MEC service from the first edge application 311. The first edge application 311 may provide an MEC service (e.g., the cache service) to the terminal 100 through the edge enabler server 320 in relation to the application client. The first edge application 311 may retrieve and subscribe to a subscription service 331 or an RNI service (not illustrated) and a cache service 333 in the service registry 340 of the edge enabler server 320 in order to pre-cache data to be provided to the application client.

The subscription service 331 or the RNI service of the edge enabler server 320 may obtain the RNI related to the terminal 100. The subscription service 331 or the RNI service may trigger a cache service based on the obtained RNI and the configured cache service triggering rule. In this case, the cache service triggering rule may be configured to trigger the cache service according to the network state of the terminal 100 determined based on the RNI. The cache service may be triggered by transmitting, by the subscription service 331 or the RNI service, information about the network state of the terminal 100 to the cache service 333.

The cache service 333 may determine data to be cached from the service server 400, based on the information about the network state of the terminal 100 and the configured cache rule. For example, when the network state of the terminal 100 is good, the cache service 333 may determine, based on the cache rule, data to be cached as first caching data 1910 about a service requiring a large amount of data (e.g., a delicate and complex service) among the services that may be provided through the application client of the terminal 100. When the network state of the terminal 100 is poor, the cache service 333 may determine data to be cached as second caching data 1920 about a service requiring only a small amount of data, based on the cache rule.

The cache service 333 may cache the determined data from the service server 400. The cache service 333 may transmit a message requesting the data 1910 or 1920 determined to be cached to the service server 400. The request message transmitted by the cache service 333 may include information about the data determined to be cached, information about the terminal 100, and information about the application client of the terminal 100. The cache service 333 may receive the requested data from the service server 400 in response to the transmitted request message and store the requested data. The cache service 333 may receive, from the service server 400, identification information of the requested data, a list of information included in the requested data, identification information of the terminal 100, or the like as information about the requested data together with the requested data.

While providing a service through the application client, the terminal 100 may have to provide a service by receiving new data when a certain event (e.g., a movement to a new place on the game) occurs. In this case, the service provided by the terminal 100 may be different corresponding to the certain event depending on the good and poor network states of the terminal 100. For example, as for the terminal 100 providing a game service, when the network state is good, the terminal 100 may provide a delicate game screen, and when the network state is poor, the terminal 100 may provide a simple game screen.

The edge data network 300 may determine that the network state of the terminal 100 is good, and pre-cache the first caching data 1910 including data about a delicate and complex game screen. As a certain event occurs in the terminal 100 having a good network state, when the terminal 100 requests the edge data network 300 (or the first edge application 311) for data, the edge data network 300 (or the first edge application 311) may directly transmit (or stream) the first caching data 1910 to the terminal 100 through the 3GPP network 200.

For example, the first edge application 311 may receive the data requested by the terminal from the edge enabler server 320 (or the cache service 333) and stream (or transmit) the same to the terminal 100. Also, the first edge application 311 may receive information about a location at which the data requested by the terminal 100 is stored from the edge enabler server 320 (or the cache service 333), obtain data based on the received information, and transmit the same to the terminal 100.

Thus, based on the RNI related to the terminal 100, according to the network state of the terminal 100, the edge data network 300 may efficiently cache data from the service server 400 located far from the terminal 100, thereby providing necessary data according to the network state of the terminal 100 without (or with reduced) latency in response to the event occurred in the terminal 100.

According to the various embodiments of the disclosure described above, the edge data network 300 may cache data from the service server 400 based on the information about the location of the terminal 100, the information about the event occurred in the terminal 100, or the RNI related to the terminal 100. However, the disclosure is not limited to the above embodiments, and any combination of the embodiments may also be included.

For example, the edge data network 300 may cache data from the service server 400 based on each or any combination of the information about the location of the terminal 100, the information about an event that occurred in the terminal 100, or the RNI related to the terminal 100. Also, the above event subscription method, the region of interest, the service triggering rule, the cache rule, or the like may be configured according to the information on which the edge data network 300 is based for caching.

Figure 20:
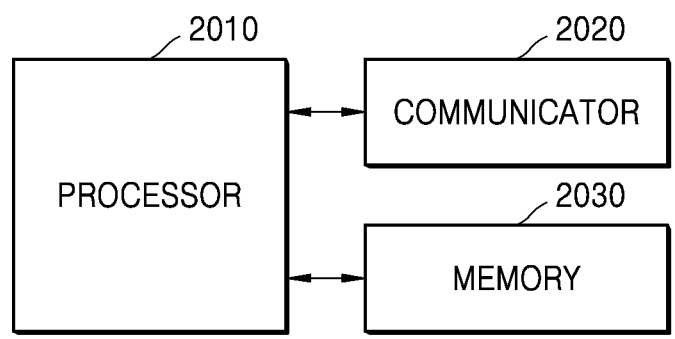
FIG. 20 is a block diagram illustrating an example edge data network according to various embodiments.

FIG. 20 is a block diagram illustrating an example edge data network according to various embodiments.

As illustrated in FIG. 20, the edge data network 300 of the disclosure may include a processor (e.g., including processing circuitry) 2010, a communicator (e.g., including communication circuitry) 2020, and a memory 2030. However, the components of the edge data network 300 are not limited thereto. For example, the edge data network 300 may include more components or fewer components than the above components. In addition, the processor 2010, the communicator 2020, and the memory 2030 may be implemented as a single chip.

According to various embodiments, the processor 2010 may include various processing circuitry and control a series of processes in which the edge data network 300 may operate according to an embodiment of the disclosure described above. For example, the components of the edge data network 300 may be controlled such that the edge data network 300 according to various embodiments of the disclosure may cache data from the service server 400. The processor 2010 may include a plurality of processors, and the processor 2010 may perform an operation of caching data from the service server 400 described above by executing a plurality of instructions (or programs) stored in the memory 2030.

According to various embodiments, the processor 2010 may control a series of processes in which the edge applications 311 and 312 and the edge enabler server 320 of the edge data network 300 illustrated in FIG. 4A may operate. For example, the edge applications 311 and 312 and the edge enabler server 320 may be implemented as a plurality of instructions (or programs). The processor 2010 may perform the operations of the edge applications 311 and 312 and the edge enabler server 320 by executing a plurality of instructions (or programs).

According to various embodiments, the processor 2010 may obtain information about the location of the terminal 100 from the 3GPP network 200. The processor 2010 may generate movement information of the terminal 100 in the region of interest based on information about the correspondence between the information about the location of the terminal 100 and a configured region of interest. The processor 2010 may cache data determined based on the movement information of the terminal 100 in the region of interest and the configured cache rule from the service server 400.

The communicator 2020 may include various communication circuitry and transmit/receive signals to/from the external device (e.g., the terminal 100), the network (e.g., the 3GPP network 200), or the server (e.g., the service server 400). The signals transmitted/received by the communicator 2020 may include control information and data. The communicator 2020 may include, for example, an RF transmitter for upconverting and amplifying a transmitted signal and an RF receiver for low-noise-amplifying and downconverting a received signal. However, this is merely an embodiment of the communicator 2020, and the components of the communicator 2020 are not limited to the RF transmitter and the RF receiver. Also, the communicator 2020 may receive a signal through a radio channel and output the signal to the processor 2010 and may transmit a signal output from the processor 2010, through a radio channel.

According to various embodiments, the communicator 2020 may transmit/receive data to/from the terminal 100 and the 3GPP network 200. For example, the communicator 2020 may receive a request for data from the terminal 100 through the 3GPP network 200 and transmit the data requested by the terminal 100 to the terminal 100. Also, the communicator 2020 may transmit/receive data about the terminal 100 (e.g., information about the location of the terminal) to/from the 3GPP network 200. According to other embodiments, the communicator 2020 may transmit/receive data to/from the service server 400. For example, the communicator 2020 may transmit a data request message to the service server 400 under the control of the processor 2010 and may receive data from the service server 400.

According to various embodiments, the memory 2030 may store a plurality of instructions (or programs) and data necessary for the operation of the edge data network 300. Also, the memory 2030 may store control information or data included in the signals transmitted/received by the edge data network 300. The memory 2030 may include a storage medium or a combination of storage media such as ROM, RAM, hard disk, CD-ROM, and DVD. Also, the memory 2030 may include a plurality of memories, and according to an embodiment of the disclosure, the memory 2030 may store a plurality of instructions (or programs) for caching data from the service server 400 by the edge data network 300, which are embodiments of the disclosure.

According to various embodiments, the memory 2030 may store data cached from the service server 400.

Figure 21:
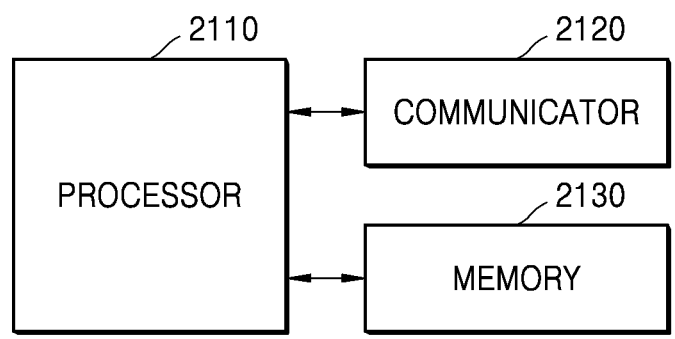
FIG. 21 is a block diagram illustrating an example terminal according to various embodiments.

FIG. 21 is a block diagram illustrating an example structure of a terminal according to various embodiments.

As illustrated in FIG. 21, the terminal 100 of the disclosure may include a processor (e.g., including processing circuitry) 2110, a communicator (e.g., including communication circuitry) 2120, and a memory 2130. However, the components of the terminal 100 are not limited thereto. For example, the terminal 100 may include more components or fewer components than the above components. In addition, the processor 2110, the communicator 2120, and the memory 2130 may be implemented as a single chip.

According to an embodiment of the disclosure, the processor 2110 may include various processing circuitry and control a series of processes in which the terminal 100 may operate according to various embodiments described above. The processor 2110 may include a plurality of processors, and the processor 2110 may perform an operation of the terminal 100 by executing a plurality of instructions (or programs) stored in the memory 2130.

According to various embodiments, the processor 2110 may control a series of processes in which the application clients 111 and 112, the edge enabler client 120, and the 3GPP communication layer 130 of the terminal 100 illustrated in FIG. 2 may operate. For example, the edge applications 111 and 112, the edge enabler client (or MEL) 120, and the 3GPP communication layer 130 may be implemented as a plurality of instructions (or programs). The processor 2110 may perform the operations of the edge applications 111 and 112, the edge enabler server 120, and the 3GPP communication layer 130 by executing a plurality of instructions (or programs).

The communicator 2120 may include various communication circuitry and transmit/receive signals to/from the network (e.g., the 3GPP network 200) or the server (e.g., the edge data network 300 or the service server 400). The signals transmitted/received by the communicator 2120 may include control information and data. The communicator 2120 may include, for example, an RF transmitter for upconverting and amplifying a transmitted signal and an RF receiver for low-noise-amplifying and downconverting a received signal. However, this is merely an embodiment of the communicator 2120, and the components of the communicator 2120 are not limited to the RF transmitter and the RF receiver. Also, the communicator 2120 may receive a signal through a radio channel and output the signal to the processor 2110 and may transmit a signal output from the processor 2110, through a radio channel.

According to various embodiments, the communicator 2120 may transmit/receive data to/from the 3GPP network 200, the edge data network 300, and the service server 400. For example, the communicator 2120 may transmit a request for data to the edge data network 300 or the service server 400 through the 3GPP network 200 and receive the requested data from the edge data network 300 or the service server 400.

According to various embodiments, the memory 2130 may store a plurality of instructions (or programs) and data necessary for the operation of the terminal 100. Also, the memory 2130 may store control information or data included in the signals transmitted/received by the terminal 100. The memory 2130 may include a storage medium or a combination of storage media such as ROM, RAM, hard disk, CD-ROM, and DVD. Also, the memory 2130 may include a plurality of memories. According to various embodiments, the memory 2130 may store a plurality of instructions (or programs) for operating the terminal 100 according to the embodiments of the disclosure described above.

The methods according to the embodiments of the disclosure described in the specification or the claims may be implemented by hardware, software, or a combination thereof.

When the methods are implemented by software, a computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EE-PROMs), magnetic disc storage devices, compact disc-ROMs (CD-ROMs), digital versatile discs (DVDs), other types of optical storage devices, or magnetic cassettes. Alternatively, the programs may be stored in a memory configured as a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured as any combination thereof. Such a storage device may be connected through an external port to an apparatus performing an embodiment of the disclosure. Also, a separate storage device on a communication network may be connected to an apparatus performing an embodiment of the disclosure.

In the disclosure, the term "computer program product" or "computer-readable recording medium" may collectively refer to a medium such as a memory, a hard disk installed in a hard disk drive, and a signal. The "computer program product" or "computer-readable recording medium" may be a means provided to a software computer system including instructions for configuring the length of a timer for receiving a missing data packet based on a network metric corresponding to a determined event according to the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

The described embodiments of the disclosure may provide a method and apparatus capable of effectively performing an MEC-based service.

While the disclosure has been illustrated and described with reference to various example embodiments, and will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A method of caching, by an edge data network, data from a service server, the method comprising:
   obtaining information about a location of a terminal and radio network information (RNI) associated with the terminal from a 3rd Generation Partnership Project (3GPP) network;
   generating movement information of the terminal in a region of interest related to a service to be provided through an application of the terminal, based on information about correspondence between the information about the location of the terminal and the region of interest;
   caching data from the service server for the service to be provided through the application of the terminal, the data being determined based on the movement information of the terminal in the region of interest, the RNI associated with the terminal, and a configured cache rule; and
   determining a storage period of the cached data based on at least the movement information of the terminal in the region of interest,
   wherein the RNI associated with the terminal includes at least one of a state of a network connected to the terminal, information of a context of the terminal, or information of a bearer of the terminal; and
   wherein the determining of the storage period of the cached data comprises:
   identifying a relative distance between the terminal and the region of interest based on the movement information of the terminal in the region of interest; and
   determining the storage period of the cached data based on the relative distance between the terminal and the region of interest.

2. The method of claim 1, wherein the obtaining of the information about the location of the terminal and the RNI associated with the terminal comprises:
   requesting a network exposure function (NEF) of the 3GPP network for the information about the location of the terminal and the RNI associated with the terminal; and
   receiving the information about the location of the terminal and the RNI associated with the terminal from the NEF.

3. The method of claim 2, wherein the requesting of the NEF for the information about the location of the terminal comprises requesting the NEF for a subscription for a report of at least one event related to the location of the terminal provided by the NEF, and
   the receiving of the information about the location of the terminal comprises receiving, from the NEF, the report of the at least one event including the information about the location of the terminal.

4. The method of claim 3, wherein the at least one event related to the location of the terminal comprises at least one event related to the location of the terminal detected by at least one of an access and mobility management function (AMF) or a gateway mobility location center (GMLC) of the 3GPP network.

5. The method of claim 1, wherein the movement information of the terminal in the region of interest comprises at least one of information indicating that the terminal is located in the region of interest, information indicating that the terminal enters the region of interest, information indicating that the terminal exits the region of interest, or information indicating that the terminal moves from a first region of interest to a second region of interest in the region of interest.

6. The method of claim 1, wherein the cache rule comprises information of mapping the movement information of the terminal in the region of interest, the RNI associated with the terminal, and the data cached from the service server, and
   the data cached from the service server comprises data about the service to be provided to the terminal according to movement of the terminal in the region of interest and the RNI associated with the terminal.

7. The method of claim 6, wherein the caching comprises:
   identifying data mapped to the movement information of the terminal in the region of interest and the RNI associated with the terminal, based on the cache rule; and
   caching the identified data from the service server.

8. The method of claim 1, wherein the region of interest and the cache rule are configured by a multi-access edge computing (MEC) application based on the service to be provided through the application of the terminal.

9. The method of claim 1, wherein the region of interest and the cache rule are configured by the service server based on the service to be provided through the application of the terminal.

10. The method of claim 1, further comprising receiving, from the terminal, information about an event that occurred in the terminal,
    wherein the caching comprises caching data from the service server determined based on the information about the event that occurred in the terminal and the cache rule.

11. An edge data network for caching data from a service server, the edge data network comprising:
    a communicator comprising communication circuitry;
    a memory storing a plurality of instructions; and
    a processor configured to execute the plurality of instructions to:
    obtain information about a location of a terminal and radio network information (RNI) associated with the terminal from a 3rd Generation Partnership Project (3GPP) network, generate movement information of the terminal in a region of interest related to a service to be provided through an application of the terminal, based on information about correspondence between the information about the location of the terminal and the region of interest, cache data from the service server for the service to be provided through the application of the terminal, the data being determined based on the movement information of the terminal in the region of interest, the RNI associated with the terminal, and a configured cache rule, and determine a storage period of the cached data based on at least the movement information of the terminal in the region of interest, wherein the RNI associated with the terminal includes at least one of a state of a network connected to the terminal, information of a context of the terminal, or information of a bearer of the terminal; and wherein the processor is further configured to execute the plurality of instructions to:

identify a relative distance between the terminal and the region of interest based on the movement information of the terminal in the region of interest, and determine the storage period of the cached data based on the relative distance between the terminal and the region of interest.

12. The edge data network of claim 11, wherein the processor is further configured to execute the plurality of instructions to:

request a network exposure function (NEF) of the 3GPP network for the information about the location of the terminal and the RNI associated with the terminal, and receive the information about the location of the terminal and the RNI associated with the terminal from the NEF.

13. The edge data network of claim 12, wherein the processor is further configured to execute the plurality of instructions to:

request the NEF for a subscription for a report of at least one event related to the location of the terminal provided by the NEF, and receive, from the NEF, the report of the at least one event including the information about the location of the terminal.

14. The edge data network of claim 13, wherein the at least one event related to the location of the terminal comprises at least one event related to the location of the terminal detected by at least one of an access and mobility management function (AMF) or a gateway mobility location center (GMLC) of the 3GPP network.

15. The edge data network of claim 11, wherein the movement information of the terminal in the region of interest comprises at least one of information indicating that the terminal is located in the region of interest, information indicating that the terminal enters the region of interest, information indicating that the terminal exits the region of interest, or information indicating that the terminal moves from a first region of interest to a second region of interest in the region of interest.

16. The edge data network of claim 11, wherein the cache rule comprises information of mapping the movement information of the terminal in the region of interest, the RNI associated with the terminal, and the data cached from the service server, and the data cached from the service server comprises data about the service to be provided to the terminal according to movement of the terminal in the region of interest and the RNI associated with the terminal.

17. The edge data network of claim 16, wherein the processor is further configured to execute the plurality of instructions to:

identify data mapped to the movement information of the terminal in the region of interest and the RNI associated with the terminal, based on the cache rule, and cache the identified data from the service server.

18. The edge data network of claim 11, wherein the region of interest and the cache rule are configured by a multi-access edge computing (MEC) application, based on the service to be provided through an application of the terminal.

19. The edge data network of claim 11, wherein the region of interest and the cache rule are configured by the service server, based on the service to be provided through an application of the terminal.

20. The edge data network of claim 11, wherein the processor is further configured to execute the plurality of instructions to:

receive information about an event occurred in the terminal from the terminal, and cache data from the service server, the data being determined based on the information about the event occurred in the terminal and the cache rule.

* * * * *